(12) United States Patent
Hayashi et al.

(10) Patent No.: US 6,386,063 B1
(45) Date of Patent: May 14, 2002

(54) STEERING WHEEL

(75) Inventors: Mikine Hayashi, Gifu; Atsushi Nagata, Inazawa; Minoru Hashimoto, Ichinomiya; Tooru Koyama, Ama-gun, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/429,927

(22) Filed: Oct. 29, 1999

(30) Foreign Application Priority Data

| Oct. 30, 1998 | (JP) | 10-311382 |
| Dec. 28, 1998 | (JP) | 10-373533 |
| Dec. 28, 1998 | (JP) | 10-373567 |
| Dec. 28, 1998 | (JP) | 10-373648 |
| Dec. 28, 1998 | (JP) | 10-373665 |

(51) Int. Cl.$^7$ .................................................. B62D 1/04
(52) U.S. Cl. ........................................ 74/552; 74/558
(58) Field of Search ...................... 74/552, 558, 558.5

(56) References Cited

U.S. PATENT DOCUMENTS 3,802,291 A * 4/1974 Young, Jr. et al. ............ 74/552
5,706,707 A * 1/1998 Sanders ........................ 74/552
6,065,366 A * 5/2000 Koyama et al. ............... 74/552

FOREIGN PATENT DOCUMENTS

| DE | 298 13 895 U 1 | 11/1998 | |
| DE | 198 48 604 A 1 | 5/1999 | |
| JP | 404163276 | * 6/1992 | 74/552 |
| JP | 405178216 | * 7/1993 | 74/552 |
| JP | 10203376 | 8/1998 | |
| JP | 10-226338 | 8/1998 | |
| JP | 10287246 | 10/1998 | |

* cited by examiner

Primary Examiner—Lenard A. Footland
Assistant Examiner—Vicky A. Johnson
(74) Attorney, Agent, or Firm—Pillsbury Winthrop LLP

(57) ABSTRACT

A steering wheel incorporates a hard portion bonded to the overall circumference in the cross-sectional circumferential direction of a ring portion and a soft portion molded to cover the core metal of the ring portion. The hard portion and the soft portion can be formed around the core metal of the ring portion by collective injection molding. A coating layer can be provided for the surface of the hard portion, and leather can be bonded to the surface of the soft portion.

1 Claim, 21 Drawing Sheets

STEERING WHEEL

BACKGROUND OF THE INVENTION

1. Field of the Invention

The present invention relates to a steering wheel for steering a vehicle, and more particularly to a steering wheel incorporating a core metal of an annular ring portion, which is held when steering is performed, structured such that a hard portion made of hard synthetic resin and a soft portion made of soft synthetic resin softer than the hard portion are disposed around the core metal such that the hard portion and the soft portion are disposed in the planar circumferential direction of the ring portion.

The present application is based on Japanese Patent Applications No. Hei. 10-311382, 10-373665, 10-373648, 10-373567, and 10-373533, which are incorporated herein by reference.

2. Description of the Related Art

Hitherto, a portion of steering wheels has a structure that a hard portion made of hard synthetic resin or a woody material and a soft portion made of soft synthetic resin softer than the hard portion are disposed around a core metal of an annular ring portion which is held when steering is performed such that the hard portion and the soft portion are disposed in the planar circumferential direction of the ring portion.

Hitherto, a portion of wood steering wheels each having a woodgrain finish has a structure that woody members are partially bonded to the outer surface of the ring portion. Another portion has a structure that a woody member is provided for the overall circumference of the ring portion by molding.

The conventional steering wheel of the foregoing type is structured such that the hard portion made of the hard synthetic resin or the woody material is partially bonded to the core metal of the ring portion in the planar circumferential direction. When the foregoing type steering wheel is arranged such that the hard portion formed in the planar circumferential direction of the ring portion by a bonding operation and the soft portion formed to cover the core metal of the ring portion by a molding operation, such as injection molding are provided, the following problem arises.

That is, when the steering wheel of the foregoing type is manufactured, the soft portion is molded before the hard portion is bonded to prevent formation of burrs of the soft portion on the surface of the hard portion. When the soft portion is molded, a dimensional error of the core metal sometimes inhibits the core metal of the ring portion to be disposed in the central portion of the cross section of the cavity if the core metal of the ring portion is introduced into the mold. If the soft portion is molded and the hard portion is then bonded to the core metal of the ring portion in a state where the deviation of the foregoing type occurs, unnecessary stepped portion 204 occurs between the hard portion 202 and the soft portion 203, as shown in FIG. 28. The reason for this will now be described. For example, the upper and lower hard portions 202 bonded to the core 201 of the ring portion can be disposed without any deviation from the coremetal 201, as shown in FIG. 29. Since the soft portion 203 covering the core metal 201 is deviated from the core metal 201, a stepped portion 204 is formed between the hard portion 202 and the soft portion 203. The foregoing stepped portion 204 deteriorates the quality of the design of the appearance of the ring portion R. As a result, there arises a problem in that a defective steering wheel is produced.

The foregoing steering wheel is manufactured by bonding the hard portion to a portion around the core metal of the ring portion. A portion of the steering wheels has a structure that both of the hard portion and the soft portion are formed by injection molding. A steering wheel of the foregoing type and the conventional problem will now be described.

The steering wheel of the foregoing type has a structure that a hard portion made of hard synthetic resin and a soft portion made of soft synthetic resin softer than the hard portion are disposed around the core metal of the ring portion constituted by a steel pipe such that the hard portion and the soft portion run in the planar circumferential direction of the ring portion. The hard portion is disposed at each of the front and rear portions of the steering wheel. Each of the portions of the hard portion is made of hard synthetic resin, such as foamed epoxy resin which covers the core metal of the ring portion. On the other hand, the soft portion is disposed in each of the right and left portions of the steering wheel, the soft portion being made of foamed urethane which covers the portion around the core metal of the ring portion.

Note that the surface of the hard portion has a thin cover formed into a woodgrain finish. The surface of the soft portion has a leather cover.

The foregoing steering wheel is manufactured such that the core metal of the steering wheel is manufactured. Then, the core metal of the steering wheel and the cover are introduced into a mold for molding the hard portion. The front and rear hard portions are collectively injection-molded. Then, the right and left soft portions are collectively injection-molded. Then, the leather member is wound around the soft portion.

If the steering wheel of the type having the hard and soft portions disposed in the planar circumferential direction of the ring portion is, for a long time, allowed to stand in the cabin of a vehicle, the temperature of which is raised, a crack sometimes occurs in the hard portion. The reason for this lies in that the coefficient of thermal expansion of the core metal of the ring portion made of the steel pipe and that of the hard portion are considerably different from each other (the core metal of the ring portion has a small coefficient of thermal expansion and the hard portion has a large coefficient of thermal expansion) Also the soft portion and the core metal of the ring portion are greatly different from each other in the coefficient of thermal expansion. Since the soft portion made of the soft material is able to absorb the difference in the coefficient of thermal expansion by elastic deformation and the like, cracks cannot easily occur.

When the hard portion is made of a low-cost polypropylene or ABS resin, the coefficient of thermal expansion of the foregoing low-cost material is made to be furthermore different as compared with the foamed epoxy resin. Therefore, there arises a problem in that the crack easily occurs.

In general, the foregoing steering wheel is structured such that the volume of the front portion of the front and rear portions which are collectively formed by injection molding is made to be larger than the volume of the rear portion.

Therefore, the molding operation is performed such that injection of the material for molding into the cavity for molding the rear hard portion is completed prior to completion of injection of the material for molding into the cavity for molding the front hard portion.

As a result, there arises a problem in that a large burr is formed adjacent to the rear hard portion as compared with the portion adjacent to the front hard portion. Therefore, there arises a problem in that an excessively large labor is required to remove the burr.

When the hard portion of the ring portion is formed, the conventional steering wheel has been molded such that one of gates arranged to inject the material for molding into the cavity of the mold and disposed at the end of the hard portion in the planar circumferential direction of the ring portion is employed, the one of the gates being disposed at a vertical-directional intermediate position of the steering wheel on the cross section of the ring portion.

The hard portion of the ring portion of the foregoing steering wheel is sometimes formed such that the gate for injecting the material for molding into the cavity of the mold is, as one of gates disposed at the ends in the planar circumferential direction of the ring portion, disposed at an intermediate position in the vertical direction of the steering wheel on the cross section of the ring portion. In the foregoing case, there arises a problem in that a weld mark is formed on the upper surface.

The core metal of the ring portion is sometimes formed by die-casting as a substitute for the steel pipe to form an inverted U-shape cross section. When the gate for molding is disposed at the intermediate position in the vertical direction of the steering wheel of the cross section of the ring portion in the foregoing case, the material for molding easily flows along the inner surface of the core metal of the ring portion. Thus, the material for molding is injected into the inner surface portion of the core metal of the ring portion. Then, the material for molding is injected into the upper surface portion of the core metal of the ring portion from the lower end portions of the two side wall portions of the cross section of the core metal of the ring portion. Therefore, a weld mark is furthermore easily formed in the upper surface portion of the core metal of the ring portion.

If the weld mark is formed in the upper surface portion, an individual coated film or the like must be formed afterwards. Since the upper surface portion is a portion which is directly observed when the steering wheel is used, the quality of the appearance of the ring portion of the steering wheel deteriorates if the foregoing coated film or the like is not provided. When a glossy coated film having a small thickness is formed, the weld mark is sometimes undesirably highlighted.

A support portion for supporting the inner surface of the leather portion bonded to the surface of the soft portion is formed at an end of the hard portion of the steering wheel of the foregoing type. Moreover, woodgrain grooves into which the ends of the leather portion are inserted are formed in the base portions of the support portion.

The leather portions are sewed together in the inner surface portion of the ring portion and, as well as bonded to the soft portion. Moreover, the inner surface of each end portion is supported by the outer surface of the support portion of the hard portion. In addition, the ends are inserted into the woodgrain grooves so as to be secured to the hard portion.

The reason why the major portion of the leather portion is provided for the soft portion lies in that a satisfactory touch can be realized in the foregoing case when the foregoing portions are held by the hands.

The reason why the ends of the leather portions are supported by the hard portions lies in that sags of the ends of the leather portion can be prevented in the foregoing case.

When the conventional steering wheel around which the leather is wound is manufactured, the core metal of the steering wheel is manufactured. Then, the core metal of the steering wheel and the coating member are introduced into the mold for molding the hard portion. Thus, the hard portion is molded. Then, the soft portion is molded, and then the leather is wound around the soft portion so as to be sewed and bonded to the soft portion. Then, the ends of the leather are supported by the outer surface of the support portion of the hard portion. In addition, the ends of the leather are inserted into the woodgrain groove.

The structure that the ends of the leather are inserted into the woodgrain groove to secure the leather to the hard portion, however, encounters a problem in that the end of the leather is separated from the woodgrain groove when the leather has been contracted owing to use of the steering wheel for a long time. Thus, there is apprehension that the appearance of the ring portion deteriorates.

SUMMARY OF THE INVENTION

To solve the foregoing problems, a first object of the present invention is to provide a steering wheel with which formation of an unnecessary stepped portion between the hard portion and the soft portion can be prevented and which is capable of improving the appearance of the ring portion.

A second object of the present invention is to provide steering wheel which is capable of preventing formation of a crack of a hard portion if the ring portion is structured such that the hard portion and a soft portion are provided for the steering wheel.

A third object of the present invention is to provide a steering wheel which can be manufactured such that formation of a burr can be prevented when a plurality of coating portions having different volumes are sectioned and provided in the planar circumferential direction of the ring portion and when the plural coating portions are collectively formed by injection molding.

A fourth object of the present invention is to provide a steering wheel which is capable of formation of a weld mark in the upper surface portion of a core metal of a ring portion thereof when a coating layer partially disposed in the planar circumferential direction of the ring portion and made of synthetic resin is formed by injection molding by using one gate disposed at an end of the coating layer.

A fifth object of the present invention is to provide a steering wheel around which leather is wound, with which ends of the leather are firmly secured to a support portion of a hard portion and which is capable of preventing occurrence of a defect in the appearance of the ring portion even after the steering wheel has been used for a long time.

According to the present invention, there is provide a steering wheel comprising: a core metal of a ring portion thereof; a soft portion formed by molding to cover the core metal of the ring portion; an extended portion integrally extended from the soft portion to surround the core metal of the ring portion; and a hard portion which is bonded to the upper surface of the extended portion and which is harder than the soft portion.

The steering wheel according to the present invention has the extended portion extended from the soft portion and formed at the position at which the hard portion is bonded. That is, when the soft portion is formed around the core metal of the ring portion by molding, also the extended portion is formed. If the extended portion is deviated from the core metal of the ring portion, the hard portion, which is bonded to the portion around the extended portion, is not deviated. That is, the hard portion can be provided for the ring portion.

The extended portion is molded integrally with the soft portion in the portion around the core metal of the ring portion. If the formed extended portion is deviated from the core metal of the ring portion, any deviation from the soft portion can be prevented in the planar circumferential direction of the ring portion. As a result, the soft portion and the hard portion bonded to the portion around the extended portion can be disposed without any deviation in the planar circumferential direction of the ring portion.

Therefore, when the hard portion bonded around the cross sectional circumference of the ring portion and the soft portion formed to cover the core metal of the ring portion by molding-are provided in the planar circumferential direction of the ring portion, the steering wheel according to the present invention is able to prevent formation of an unnecessary stepped portion between the hard portion and the soft portion. As a result, the appearance of the ring portion can be improved.

The steering wheel according to the present invention incorporates the soft portion and the extended portion made of the same material and provided for the overall circumference in the planar circumferential direction of the ring portion to cover the core metal of the ring portion. Therefore, a necessity for performing an operation for cutting burrs of the soft portion can be eliminated. Therefore, the number of man-hours and manufacturing cost can be reduced. That is, as shown in FIGS. 28 and 29, the conventional structure is formed such that a soft portion 203 is formed apart from the position at which a hard portion 202 is disposed. Therefore, burrs formed in the bonding portion, allowed to adhere to the outer surface of the core metal of the ring portion 201 and extending from the soft portion 203, must be removed before the hard portion 202 is bonded after the soft portion 203 has been formed.

The steering wheel according to the present invention comprises: a core metal of a ring portion thereof; a hard portion disposed around the core metal of the ring portion; and a soft portion which is disposed around the core metal of the ring portion and which is softer than the hard portion. The hard portion and the soft portion are disposed in the planar circumferential direction of the core metal of the ring portion. The core metal of the ring portion has an inverted U-shape cross sectional shape and made of a die-cast metal.

The steering wheel according to the present invention has the core metal of the ring portion made of the die-cast metal. The general-purpose die-cast metal material for use in the die-cast operation is a light alloy, such as an aluminum alloy or a magnesium alloy. Each of the foregoing die-cast metal materials has a coefficient of thermal expansion which is about two times the coefficient of thermal expansion of a conventional steel pipe. Therefore, the coefficient of thermal expansion of the core metal of the ring portion closes to the coefficient of thermal expansion of the hard synthetic resin which constitutes the hard portion. Therefore, even if the steering wheel is allowed to stand in the cabin of a vehicle, the temperature of which is raised excessively, the hard portion cannot easily be cracked.

That is, a die-cast metal material having a coefficient of thermal expansion of $20 \times 10^{-6}/°C$. or greater is employed to constitute the core metal of the ring portion. Thus, the coefficient of thermal expansion of the core metal of the ring portion can be made to be about two or more times the coefficient of thermal expansion of the conventional steel pipe because the conventional steel pipe has a coefficient of thermal expansion of $12.1 \times 10^{-6}/°C$. Therefore, the coefficient of thermal expansion of the core metal of the ring portion can be made to be closer to the coefficient of thermal expansion of the hard synthetic resin which constitutes the hard portion. Therefore, even if the steering wheel is allowed to stand in the cabin of a vehicle, the temperature of which is raised excessively, the hard portion cannot easily be cracked.

The core metal of the ring portion has the inverted U-shape cross section to enlarge the surface area. Therefore, heat conducted from the hard portion can easily be absorbed. Moreover, absorbed heat can be conducted from the core metal of the ring portion to the steering shaft and the like through the spokes and the core metal of the boss portion of the steering wheel. Thus, the temperature of the hard portion can easily be lowered. As a result, thermal expansion of the hard portion can be prevented. Hence it follows that a crack of the hard portion can furthermore easily be prevented.

Therefore, when the ring portion of the steering wheel according to the present invention is structured such that the hard portion made of the hard synthetic resin and the soft portion made of the soft synthetic resin softer than the hard portion are disposed in the planar circumferential direction of the ring portion at a position around the core metal of the ring portion, occurrence of a crack of the hard portion can be prevented.

If the core metal of the ring portion has the inverted U-shape cross section, the core metal of the ring portion is made of die-cast. Therefore, when the cavity of the die-cast mold is formed to correspond to a required shape, the foregoing cross sectional shape can easily be maintained.

When the core metal of the ring portion has the inverted U-shape cross section, another effect can be obtained in that the bending strength of the ring portion which is exerted on the axial direction of the steering wheel can be enlarged.

A method of manufacturing a steering wheel according to the present invention is structured such that time at which injection into each cavity of the mold for forming each coating portion is made to be substantially the same when the coating portions including the hard and soft portions sectioned from each other and having different volumes are molded. Therefore, the operation of the injecting machine for injecting the material for molding into each cavity of the mold can be interrupted to correspond to time at which injection is completed. When the operation of the injecting machine is interrupted, no injecting pressure is applied to the inside portion of each cavity. As a result, occurrence of a burr in the vicinity of each coating portion can be prevented. Hence it follows that an operation for removing burrs which must be performed after the molding operation has completed can be facilitated.

The resistance of the material for molding which arises when the material passes through each runner extending from a sprue of the mold is changed to be inversely proportional to the volume of the coating portion. That is, the resistance of the material for molding which passes through the runner for molding the coating portion having a large value is made to be low. On the other hand, the resistance of the material for molding which passes through the runner for molding the coating portion having a small volume is made to be high. Thus, time required to complete injection of the material into the cavity for molding the coating portion having the large volume can be shortened. On the other hand, time required to complete injection of the material into the cavity for molding the coating portion having the small volume can be elongated. Therefore, time required to complete injection of each material for molding into each cavity of the mold can be made to be substantially the same.

An accumulating portion for accumulating the materials for molding are provided for each runner extending from the sprue of the mold for molding the coating portion having the small volume. Thus, no accumulating portion is provided for the runner for molding the coating portion having the large volume. Thus, time required to complete injection of the material into the cavity for molding the coating portion having the small volume can be elongated because the material for molding is accumulated in the accumulating portion. Therefore, time required to complete injection of each material for molding into each cavity of the mold can be made to be substantially the same.

The steering wheel according to the present invention has the structure that the coating layer including the hard portion and the soft portion which are partially disposed in the planar circumferential direction of the ring portion is molded by a gate which is used in the molding operation and which is disposed above the split surface of the molded portion in the mold.

Therefore, the material for molding which is used in the molding operation conflicts with the upper surface of the core metal of the ring portion when the material has been injected into the cavity through the gate. Therefore, the material flows along the upper surface of the core metal of the ring portion so as to be charged by a certain quantity in the upper surface portion of the core metal of the ring portion. Then, the material flows to the lower surface portion of the core metal of the ring portion.

Therefore, the weld mark is formed in the lower surface of the coating layer. As a result, formation of a weld mark on the upper surface of the coating layer which deteriorates the appearance of the steering wheel can be prevented.

Therefore, the steering wheel according to the present invention permits the coating layer partially disposed in the planar circumferential direction of the ring portion and made of the synthetic resin is formed by injection molding by using one gate disposed at an end of the coating layer. Even in the foregoing case, formation of a weld mark on the upper surface of the core metal of the ring portion can be prevented.

The cross sectional shape of the core metal of the ring portion may be formed to have the inverted U-shape cross section such that the lower portion of the steering wheel is opened by providing a ceiling wall portion which connects the right and left side walls to each other at the top ends of the right and left side walls. In the foregoing case, the material for molding which is injected from the gate into the cavity when the molding operation is performed conflicts with the upper surface of the core metal of the ring portion. Thus, the material flow along the upper surface of the core metal of the ring portion so as to be injected by a certain quantity in the upper surface portion of the core metal of the ring portion. Then, the material flows to the lower surface portion of the core metal of the ring portion. Therefore, if the coating layer is partially formed around the core metal of the ring portion having the inverted U-shape cross section, formation of a weld mark in the upper surface of the coating layer can be prevented. As a result, a defective appearance of the coating layer can be prevented.

When the cross sectional shape of the core metal of the ring portion is formed into the inverted U-shape, the material for molding first injected into the inner surface portion of the cross section causes the core metal of the ring portion to upwards be pushed. Thus, deviation of the core metal of the ring portion occurs. The steering wheel according to the present invention, however, causes the material for molding injected through the gate disposed above the core metal of the ring portion to downwards push the core metal of the ring portion. Therefore, upward push of the core metal of the ring portion can be prevented. As a result, the foregoing deviation and deformation of the core metal of the ring portion can be prevented.

If a glossy coating film is formed on the surface of the coating layer, no weld mark is formed on the upper surface of the coating layer. Therefore, deterioration in the appearance of the ring portion can be prevented.

When the core metal of the steering wheel is formed by die-casting, the split surface of the mold is made coincide with the split surface of the casting mold for casting the core metal of the ring portion at a position of the end in the planar circumferential direction of the ring portion of the coating layer. Thus, removal of burr of the coating layer can easily be performed.

That is, when the core metal of the steering wheel is die-cast in such a manner that the core metal of the ring portion has the inverted U-shape cross sectional shape, the casting mold is usually constituted by a split mold composed of two sections which are opened/closed in the vertical direction of the steering wheel. Moreover, the split surfaces of the two split molds are disposed with reference to the lower end surface of each of the two side walls on the cross section of the core metal of the ring portion. When the draft of each of the split molds is considered, the inner surface of the cross section of the core metal of the ring portion is opened downwards. The outer surface is narrowed upwards.

Therefore, the split surface of the mold is made coincide with the split surface of the casting mold in the portion in which burrs are removed. Thus, the lower split mold is forcibly brought into contact with only the lower surfaces of the two side walls of the core metal of the ring portion and the inner surfaces of the side wall and the ceiling wall. On the other hand, the upper split mold is forcibly brought into contact with only the outer surfaces of the two side walls and the ceiling wall of the core metal of the ring portion. Thus, the burr-removing surface of the split mold of the mold can easily be placed along the draft of the core metal of said ring portion.

As a result, the burr-removing surface of the upper and lower split mold is able to completely press the overall circumference of the core metal of the ring portion at the position at which burrs are removed. As a result, removal of the burrs can satisfactorily be performed.

A case will now be described in which the cross sectional shape of the core metal of the ring portion is formed into the inverted U-shape to locate the split surface of the mold is located with reference to a substantially intermediate portion of the cross section of the core metal of the ring portion in the vertical direction. In the foregoing case, the burr-removing surface of the lower split mold cannot be forcibly brought into contact with the outer surface adjacent to the lower ends of the two side walls of the core metal of the ring portion. The reason for this lies in that the draft inhibits forcible contact with the outer surface because the outer surface adjacent to the lower ends of the two side walls of the core metal of the ring portion are narrowed upwards. Therefore, a gap is inevitably formed between the lower split mold adjacent to the split surface and the outer surface of the two side walls of the core metal of the ring portion. As a result, the material for molding leaks through the gap. Therefore, removal of burrs cannot satisfactorily be performed.

The steering wheel around which leather is wound according to the present invention has the structure that the coating layer for covering the hard portion is applied to the outer surface of the support portion including a projection portion. Therefore, the soft layer and the leather can be bonded to the hard portion.

That is, the adhesive agent which is applied to the soft portion is as well as applied to the coating layer of the support portion. Thus, the coating layer can be used as a primer layer to enable the ends of the leather to be bonded to the hard portion. As a result, the ends of the leather cannot easily be removed from the hard portion. That is, the ends of the leather can firmly be secured to the support portion of the hard portion. As a result, occurrence of a defective appearance of the ring portion can be prevented.

The coating layer serving as the primer layer for the leather is formed as surface treatment for the hard portion. Therefore, the foregoing coating layer can be formed by extending the coating. Therefore, the number of man-hours and the manufacturing cost of the steering wheel can be reduced.

The coating layer is also applied to the projection portion projecting toward the inner surface of the soft portion at a position apart from the inner surface of the leather in the support portion in addition to the support surface for supporting the leather in the support portion for the hard portion. Therefore, the soft portion can be bonded to the hard portion.

Therefore, contraction of the formed soft portion can be prevented. Thus, separation of the soft portion from the hard portion and the core metal of the ring portion can be prevented. As a result, deterioration in the touch when the leather portions are held by the hands can be prevented.

Features and advantages of the invention will be evident from the following detailed description of the preferred embodiments described in conjunction with the attached drawings.

BRIEF DESCRIPTION OF THE DRAWINGS

In the accompanying drawings

DETAILED DESCRIPTION OF THE PREFERRED EMBODIMENTS

Figure 1:
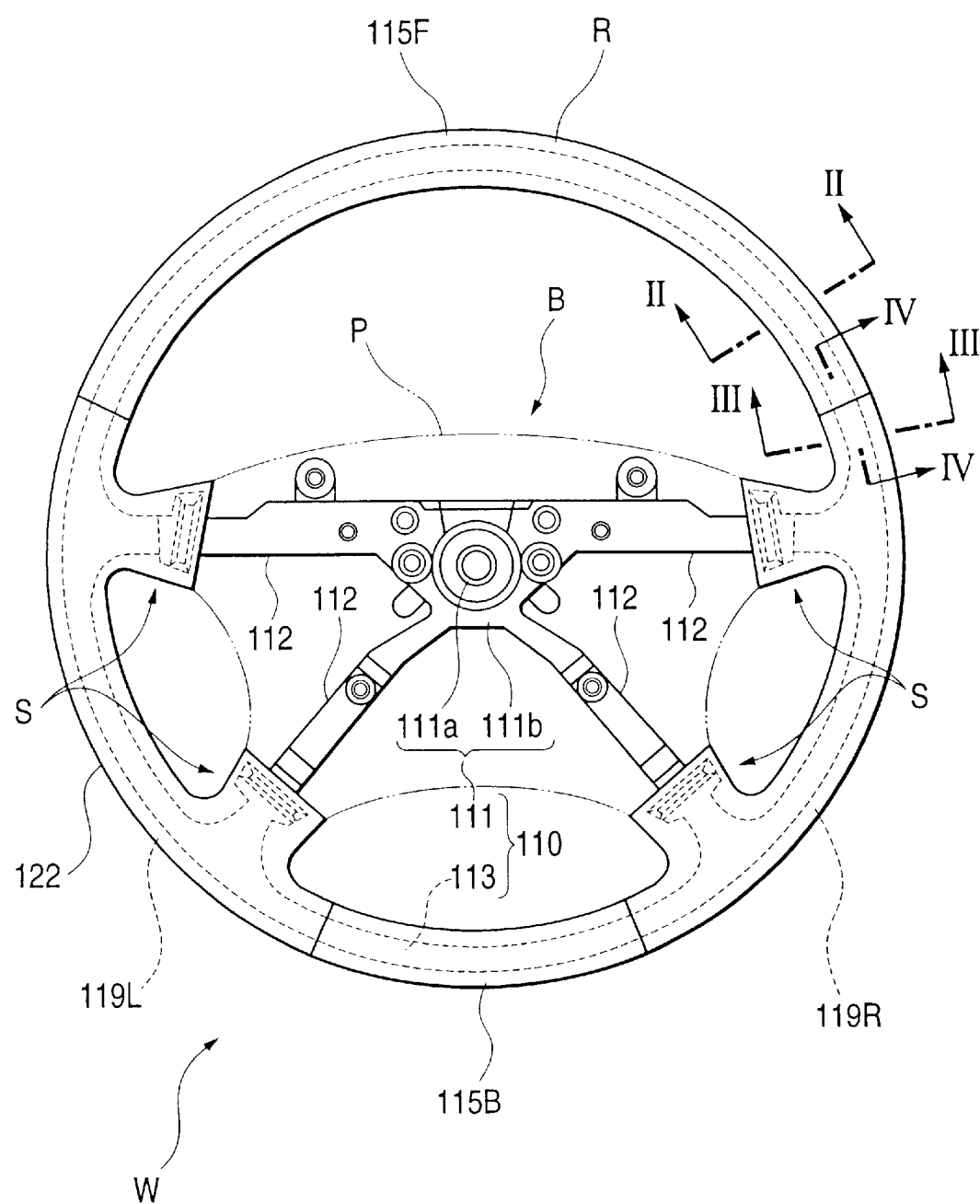
FIG. 1 is a plan view showing a steering wheel according to a first embodiment of the present invention.

A first embodiment of the present invention will now be described with reference to FIGS. 1 to 5. As shown in FIG. 1, a steering wheel W according to this embodiment incorporates an annular ring portion R which is held when steering is performed; a boss portion B disposed in the central portion of the ring portion R; and four spokes S for connecting the ring portion R and the boss portion B to each other. Each of the foregoing portions has a core metal 110 for establishing the connections.

The core metal 110 incorporates a boss-portion core metal 111 provided for the boss portion B; a spoke-portion core metal 112 provided for each spokes S; and a ring-portion core metal 113 provided for the ring portion R. The 'core metal 110 is structured such that a boss 111a in the central portion of the boss-portion core metal 111 which is connected to a steering shaft of a vehicle (not shown) is made of steel. On the other hand, a boss plate 111b, a spoke-portion core metal 112 and a ring-portion core metal 113 around the boss 111a are made of die-cast metal, such as an aluminum alloy. The ring-portion core metal 113 has an inverted U-shape cross sectional shape, as shown in FIGS. 2 and 3.

As shown in FIG. 1, hard portions 115F and 115B are bonded to front and rear portions of the ring portion R in the direction of the vehicle. On the other hand, soft portions 119R and 119L made of urethane or the like and formed by injection molding (reaction injection molding included) are disposed in the right and left portions of the ring portion R in the lateral direction of the vehicle.

Figure 2:
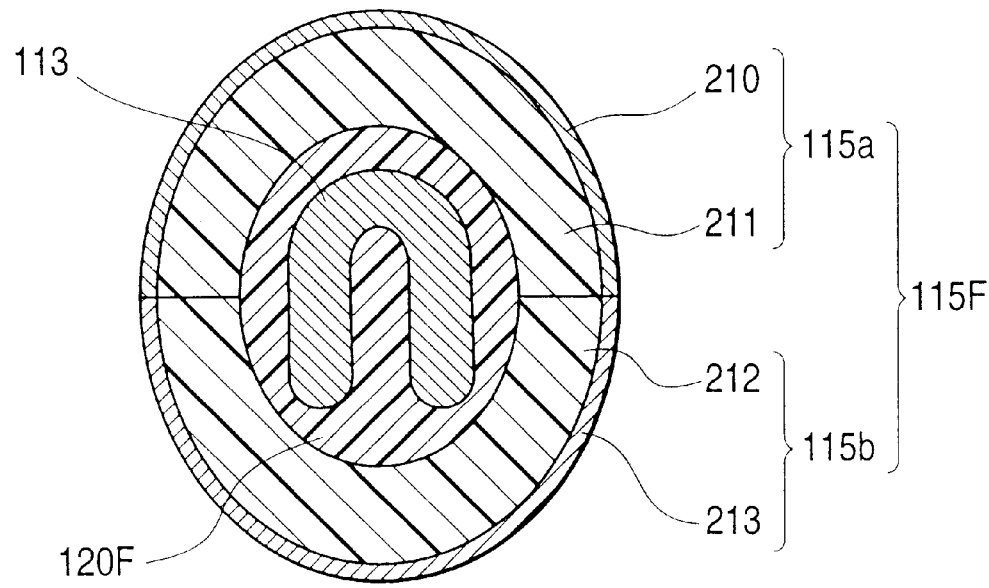
FIG. 2 is a cross sectional view taken along line II—II shown in FIG. 1 and showing a ring portion according to the embodiment of the present invention.
Figure 3:
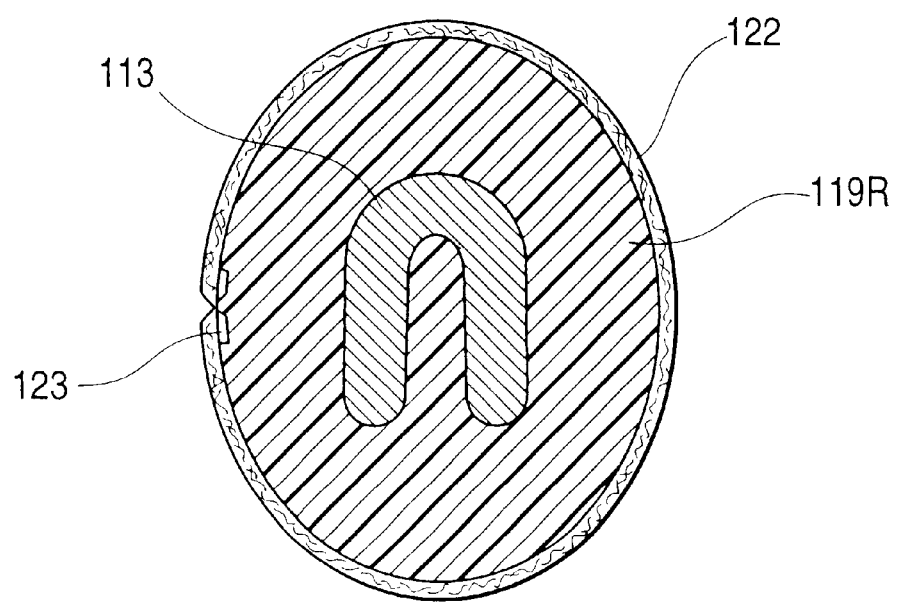
FIG. 3 is a cross sectional view taken along line II—III shown in FIG. 1 and showing the ring portion according to the embodiment of the present invention.
Figure 4:
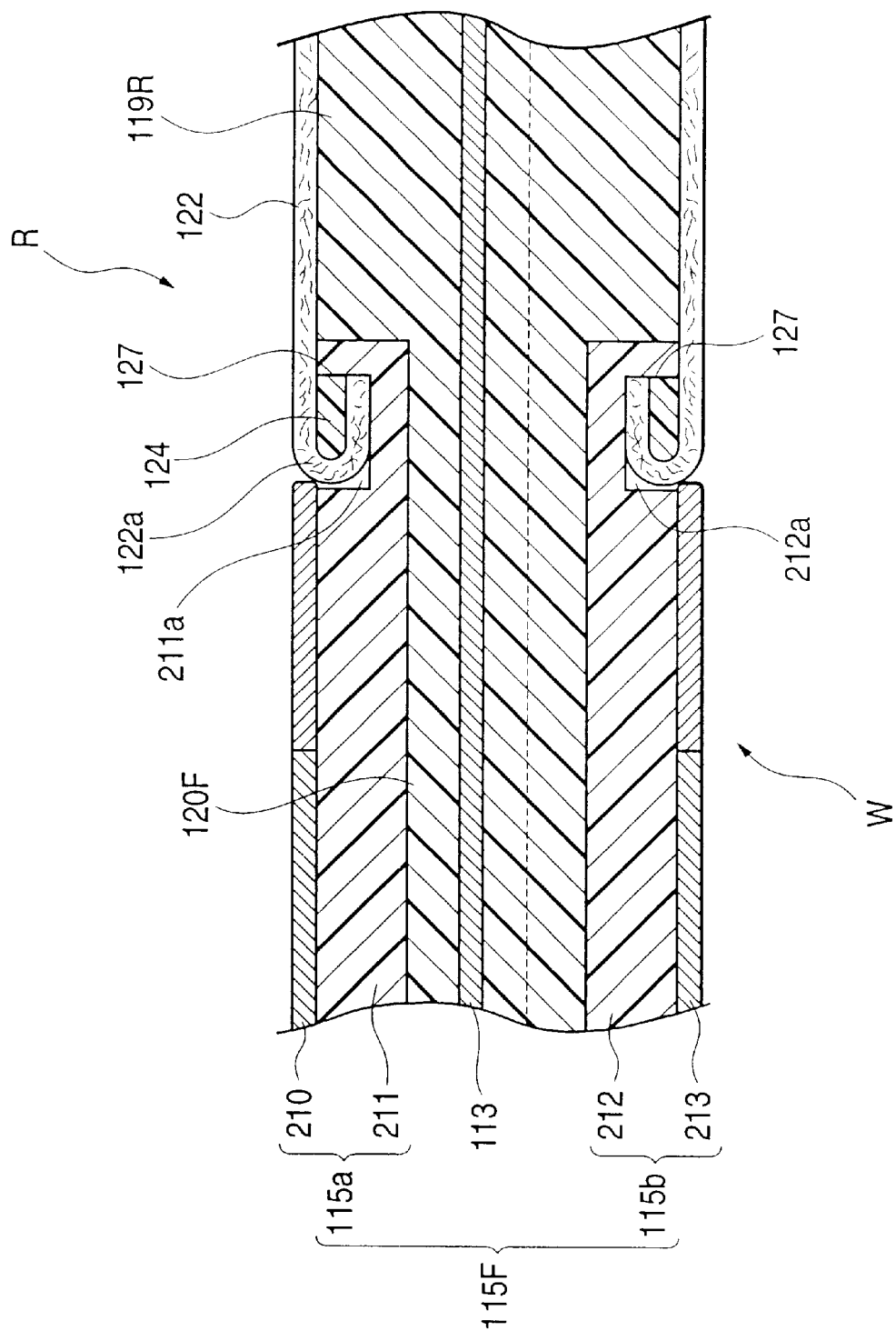
FIG. 4 is a cross sectional view taken along line IV—IV shown in FIG. 1 and showing the ring portion according to the embodiment of the present invention.

Each of the hard portions 115F and 115B disposed in front of the ring portion R and in the rear of the same is, as shown in FIGS. 2 and 4, composed of an upper split member 115a having an inverted U-shape cross sectional shape and a lower split member 115b having a U-shape cross sectional shape, the upper split member 115a and the lower split member 115b being divided in the vertical direction. The split members 115a and 115b respectively incorporate bases 211, 212 disposed in the inside portion and made of epoxy resin or the like; and decorative portions 210, 213 having a structure that a natural wood having a woodgrain finish is coated with predetermined protective coating layer. Each of the split members 115a and 115b is manufactured by previously forming the decorative portions 210, 213 to correspond to the shape of the ring portion R in which each of the split members 115a and 115b is disposed and by introducing the decorative portions 210, 213 into an injection molding mold for molding the bases 211, 212. After the mold has been closed, a material for molding the bases 211, 212 is injected into a cavity to manufacture the split members 115a and 115b.

As shown in FIG. 4, ends of the bases 211, 212 of each of the split members 115a and 115b adjacent to the soft portions 119R and 119L have recess grooves 211a, 212a for receiving an end 122a of a leather 122 to be described later, the recess grooves 211a, 212a being formed in the cross-sectional circumferential direction of the ring portion R.

The soft portions 119R and 119L disposed on the right and left sides of the ring portion R softer than the hard portions 115F and 115B are disposed to cover a region from the circumference portion of the ring-portion core metal 113 to the ring portion R of the spoke-portion core metal 112. As shown in FIGS. 2 and 4, this embodiment has the structure that the leather 122 is sewed to the surface of each of the soft portions 119R and 119L by using a sewing thread 123 at a position adjacent to the boss portion B on the inside of the ring portion R.

Each leather 122 has a developed shape having sections which are capable of covering the upper and lower surfaces of each of the soft portions 119R and 119L are connected at a position on the outer surface of the ring portion R. An end 122a of each leather 122 is, as shown in FIG. 4, bonded and wound around a core tube 124 made of a hard synthetic resin, such as annular ABS resin. Moreover, an adhesive agent 127 is employed to bond the end 122a to the inner surfaces of the recess groove 211a, 212a so that the end 122a is disposed in the recess grooves 211a, 212a of the hard portions 115a and 115b. The core tube 124 can be divided into a plurality of sections in the circumference direction.

Figure 5:
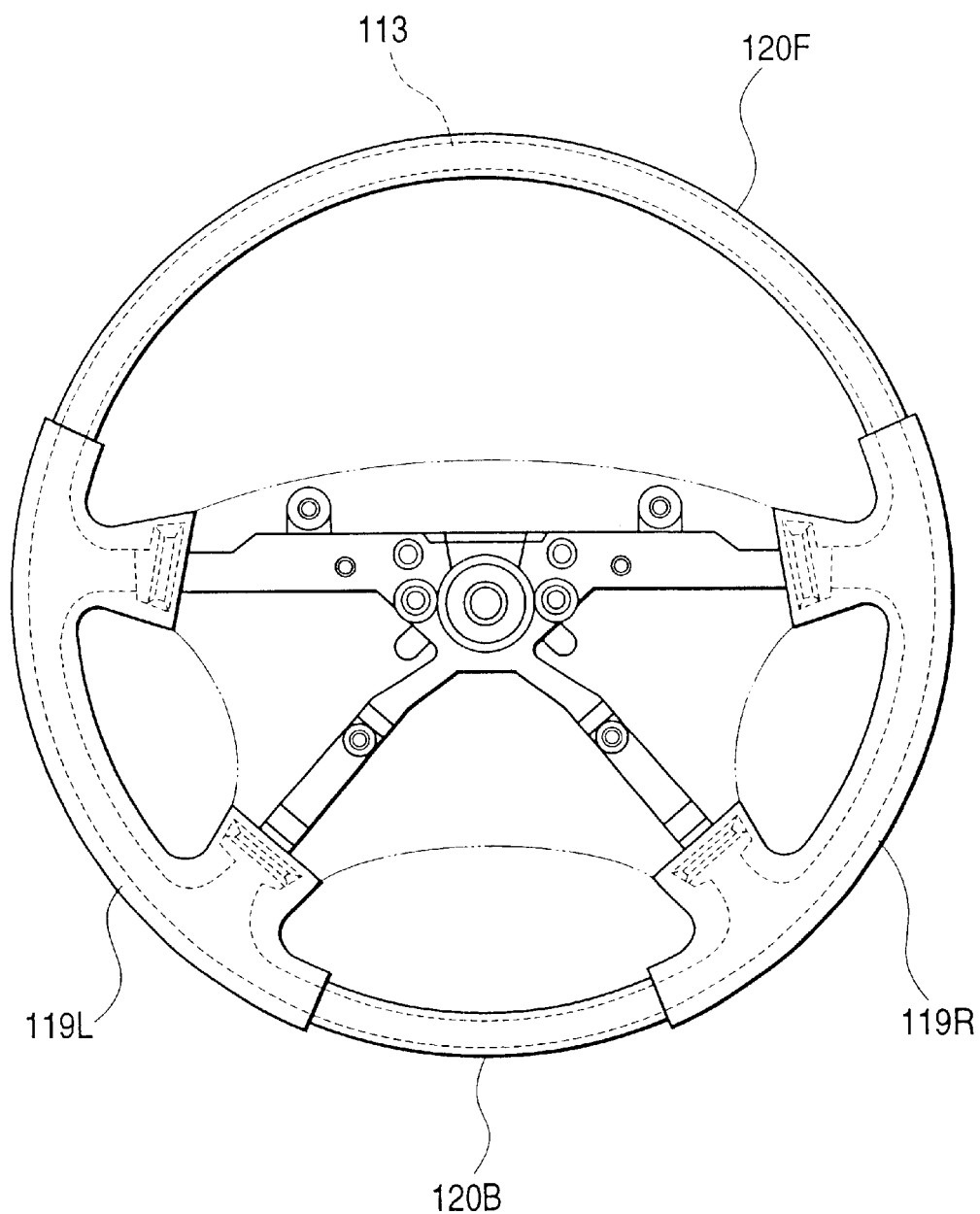
FIG. 5 is a plan view showing a state in which a soft portion and an extended portion are provided for the core metal of the ring portion according to the embodiment by molding.

As shown in FIGS. 2, 4 and 5, this embodiment has a structure that extended portions 120F and 120B extending from the soft portion 119 are disposed between the inner surfaces of the bases 211, 212 of the hard portions 115F and 115B and the ring-portion core metal 113. The thickness of each of the front and rear extended portions 120F and 120B is smaller than the thickness of each of the soft portions 119R and 119L by a quantity corresponding to the thickness of the bases 211, 212 of each of the hard portions 115F and 115B. The extended portions 120F and 120B are disposed to cover the overall cross-sectional circumference of the ring-portion core metal 113 for which the hard portions 115F and 115B are provided. The extended portions 120F and 120B are made of the same material as that of the soft portion 119. Simultaneously with molding of the soft portion 119, the extended portions 120F and 120B are molded.

The method of manufacturing the steering wheel W according to this embodiment will now be described. A core metal 110 is previously manufactured. The core metal 110 is manufactured by introducing a boss 111a into a predetermined die-casting mold so that die-casting is performed. Also the split members 111a and 115b of the front and rear hard portions 115F and 115B are previously molded by injection-molding the bases 211, 212 such that the decorative portions 210, 213 are placed as an insert.

The core metal 110 is introduced into the injection molding mold for molding the soft portion 119 and the extended portion 120. Then, the mold is closed, and then a predetermined material for molding is injected into a cavity. As shown in FIG. 5, the soft portion 119 and the extended portion 120 are formed by injection molding to cover the spoke-portion core metal 112 and the ring-portion core metal 113.

Then, the molded members are released from the opened mold. Then, an adhesive agent is applied to the outer surface of each of the extended portions 120F and 120B and the opposite surfaces of the split members 115a and 115b. Thus, the split members 111a and 115b are bonded to the outer surfaces of the extended portions 120F and 120B.

Then, the end 122a of the leather 122, which is wound around the outer surface of each of the soft portions 119R and 119L, is bonded and wound around the core tube 124. Then, an adhesive agent is applied to the outer surface of each of the soft portions 119R and 119L. Then, the leather 122 is wound while a sewing thread 123 is being used to sew the leather 122. Thus, the steering wheel W can be manufactured. The core tube 124 around which the end 122a of the leather 122 have been wound is bonded to the inner surface of the recess grooves 211a, 212a as described above.

When the steering wheel W is joined to the vehicle, a lower cover (not shown) for covering the lower portion of the boss portion B is joined. Then, the boss 111a is joined to the steering shaft by using a nut. Then, a pad P for covering the upper surface of the boss portion B is joined so that the manufactured steering wheel W is joined to the vehicle.

As described above, the steering wheel W according to this embodiment the extended portions 120F and 120B extending from the soft portions 119R and 119L are formed in the portions to which the hard portions 115F and 115B are bonded. That is, when the soft portions 119R and 119L are provided for a portion around the ring-portion core metal 113 by molding, also the extended portions 120F and 120B are formed. If the extended portions 120F and 120B are deviated from the ring-portion core metal 113, deviation of the hard portions 115F and 115B, which are bonded to the portion around the extended portions 120F and 120B, from the extended portions 120F and 120B can be prevented. Thus, the hard portions 115F and 115B can be provided for the ring portion R.

The extended portions 120F and 120B are, at positions around the ring-portion core metal 113, molded integrally with the soft portions 119R and 119L. Therefore, even if the extended portions 120F and 120B are deviated from the ring-portion core metal 113, deviation from the soft portions 119R and 119L in the planar circumferential direction of the ring portion R can be prevented. As a result, the soft portions 119R and 119L and the hard portions 115F and 115B bonded to the positions around the extended portions 120F and 120B can be disposed in the planar circumferential direction of the ring portion R without any deviation.

The steering wheel W according to this embodiment permits a structure that the hard portions 115F and 115B bonded to the overall cross-sectional circumferential direction of the ring portion R and the soft portions 119R and 119L formed to cover the ring-portion core metal 113 by molding and softer than the hard portions 115F and 115B are disposed in the planar circumferential direction of the ring portion R. Even in the foregoing case, formation of an unnecessary stepped portion between the hard portions 115F and 115B and the soft portions 119R and 119L can be prevented. The position, at which the leather 122 and the outer surface of the hard portions 115F and 115B are formed, and the outer surface of the hard portions 115F and 115B can concentrically be continued. As a result, the appearance of the ring portion R can be improved.

The steering wheel W according to this embodiment has the structure that the soft portions 119R and 119L and the extended portions 120F and 120B made of the same material are disposed in the overall planar circumferential direction of the ring portion R to cover the ring-portion core metal 113. Therefore, removal of burrs of the soft portions 119R and 119L can be omitted. As a result, the number of man-hours for manufacturing the steering wheel W and the cost of the same can be reduced.

The steering wheel W according to this embodiment has the structure that the core tube 124 is bonded to the inner surfaces of the recess grooves 211a, 212a in a state in which the end 122a of the leather 122 are wound around the hard core tube 124 so as to be joined into the recess grooves 211a, 212a of each of the hard portions 115F and 115B. Therefore, sagging of the end 122a of the leather 122 can be prevented. Moreover, if the leather 122 is contracted in the planar circumferential direction of the ring portion, the core tube 124 bonded to the inside portions of the recess grooves 211a, 212a holds the leather 122 to limit the position. Therefore, movement of the end 122a of the leather 122 can be prevented. As a result, the appearance of the ends of the leather 122 can satisfactorily be maintained for a long time.

When the end 122a of the leather 122 are wound around the hard core tube 124 so as to be introduced into the recess grooves 211a, 212a as is employed in this embodiment, introduction into large recess grooves 211a, 212a is permitted as compared with a structure that the end 122a is directly introduced into a woodgrain groove provided for the hard portion 115. Moreover, rigidity can be imparted to the end 122a. Therefore, the operation for joining the leather 122 can satisfactorily be performed.

Figure 6:
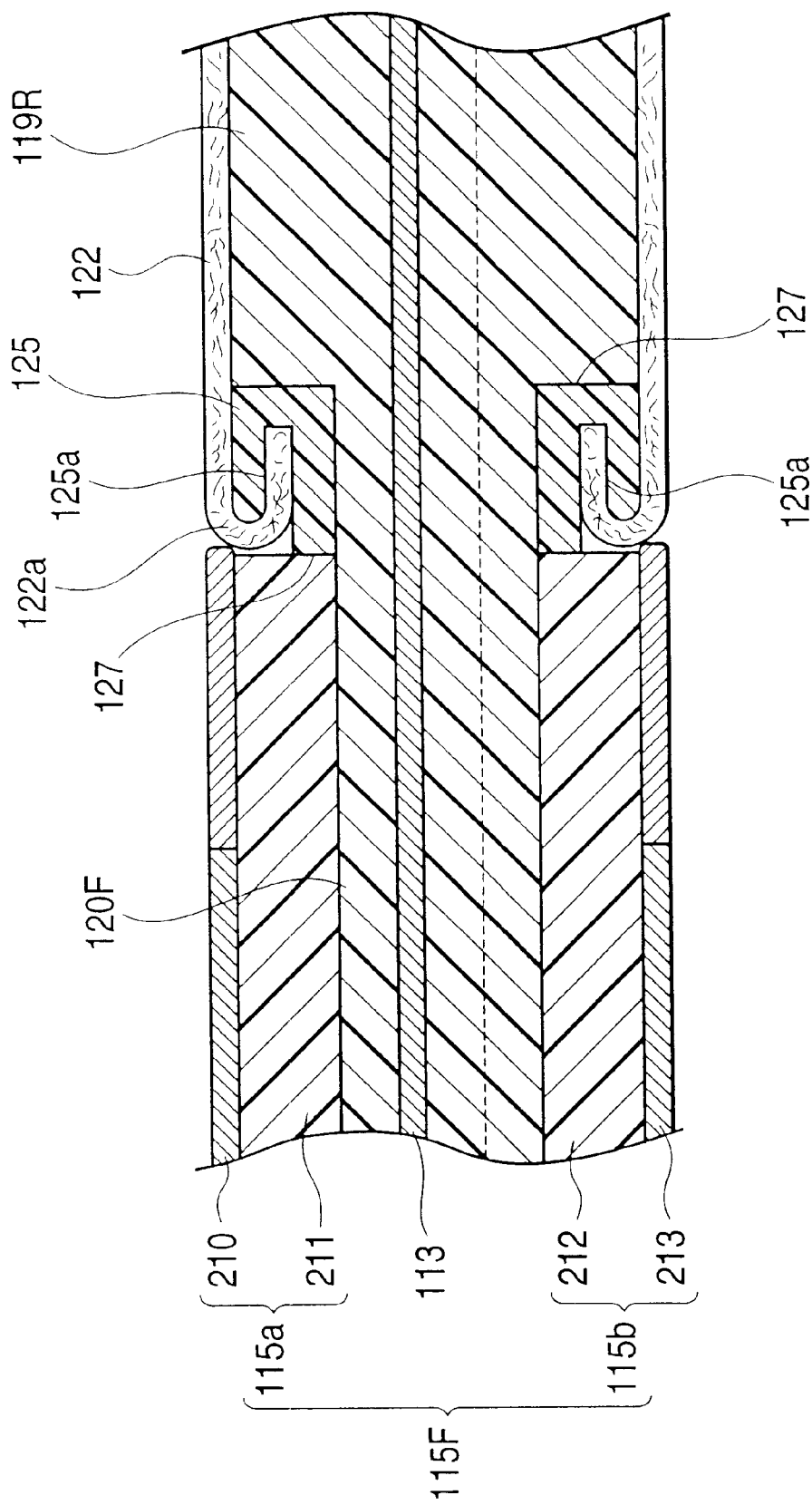
FIG. 6 is a cross sectional view showing a ring portion according to a modification to the first embodiment.

A process of the end 122a of the leather 122 may be performed such that the recess grooves 211a, 212a are not provided for the hard portion 115. Moreover, as shown in FIG. 6, the end 122a are introduced and bonded to an annular groove 125a provided for the hard core tube 125 which can be decomposed in the circumference direction. Then, the core tube 125 are bonded to the bases 211, 212, the soft portion 119 and the extended portion 120 by using an adhesive agent 127 so as to dispose the leather 122. If the core tubes 124 and 125 can easily be bonded to the bases 211, 212 and the soft portion 119, a hard synthetic resin plate or a metal plate which can easily be deflected in the cross-sectional circumference direction of the ring portion R may be employed.

In this embodiment, the leather 122 is provided for the surfaces of the soft portions 119R and 119L. The present invention may be applied to a steering wheel which does not incorporate the leather 122. In the foregoing case, the recess groove 211a, 212a are not required for the bases 211, 212.

In this embodiment, the hard portion 115F and 115B are structured into two-layer shape incorporating the bases 211, 212 and the decorative portions 210, 213 disposed on the outer surface of the bases 211, 212 and made of a natural wood material having a woodgrain finish. The decorative portions 210, 213 may have a structure that a protective coating layer is provided and a printed layer having a predetermined pattern is provided. The hard portion 115 may be constituted by a single layer made of a woody material or a hard synthetic resin having a protective layer. The hard portion 115 is not limited to the two split members 115a and 115b. The hard portion 115 may be composed of three or more split members.

In this embodiment, the soft portion 119 and the extended portion 120 are formed by injection molding. If a mold can be employed to mold the soft portion 119 and the extended portion 120 to cover the ring-portion core metal 113, the soft portion 119 and the extended portion 120 may be formed by compression-molding or pouring as a substitute for the injection molding (including reactive injection molding).

Figure 7:
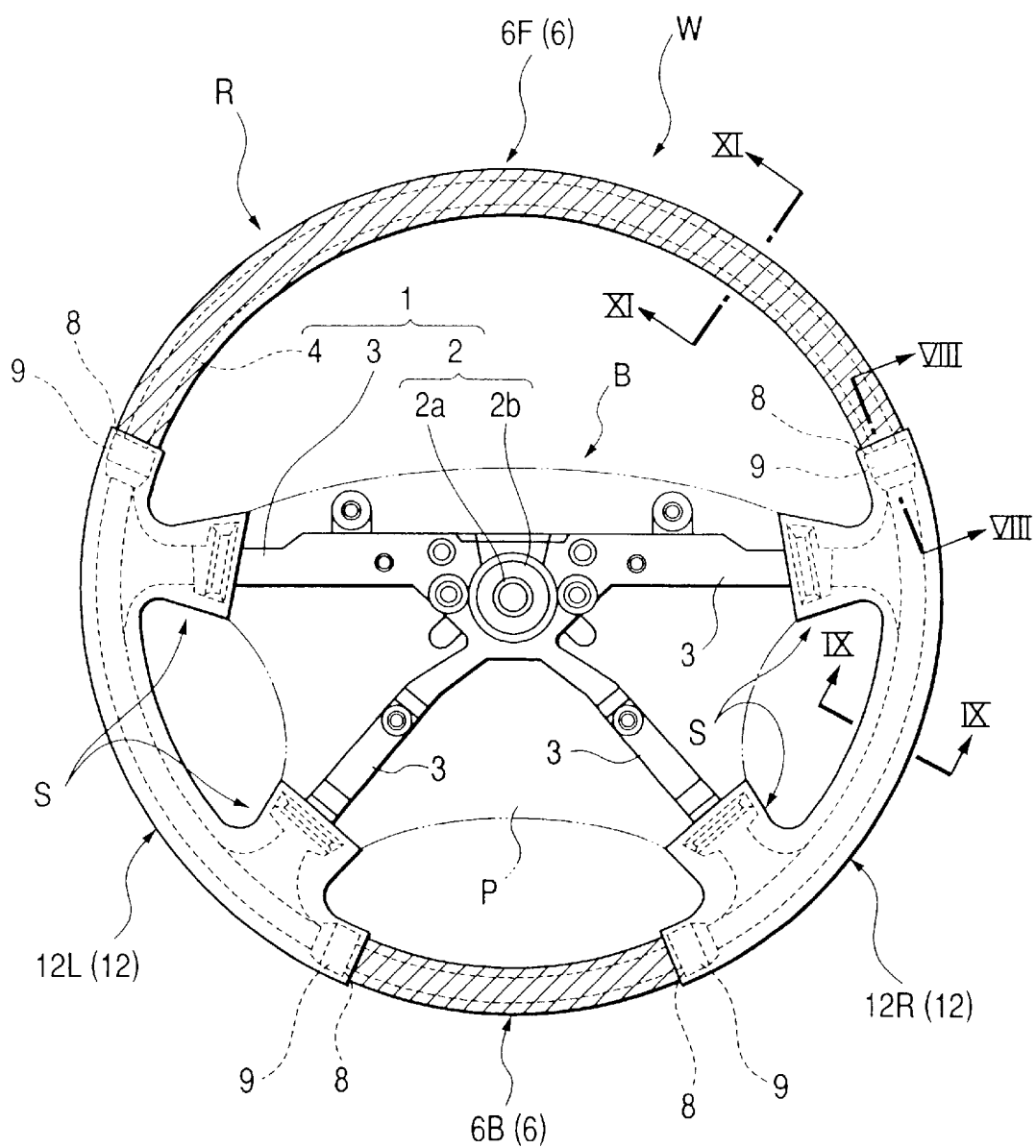
FIG. 7 is a plan view showing a steering wheel according to a second embodiment of the present invention.

A second embodiment of the present invention will now be described with reference to FIGS. 7 to 10. As shown in FIG. 7, a steering wheel W according to this embodiment incorporates a ring portion R, a boss portion B and a spokes S. Each portion is provided with a steering-wheel core metal 1 for establishing the connections among the portions. That is, as shown in FIGS. 7 and 10, the steering-wheel core metal 1 incorporates a boss-portion core metal 2 provided for the boss portion B, a spoke-portion core metal 3 provided for each of spokes S and a ring-portion core metal 4 provided for the ring portion R.

The steering-wheel core metal 1 is structured such that a boss 2a in the central portion of the boss-portion core metal 2 which is connected to the steering shaft is made of steel. Moreover, the other portions, that is, a boss cover 2b around a boss 2a of the boss-portion core metal 2, a spoke-portion core metal 3 and a ring-portion core metal 4 are made of die-cast metal formed by die-casting using a light alloy, such as a magnesium alloy or an aluminum alloy.

The die-cast metal for forming the boss cover 2b, the spoke-portion core metal 3 and the ring-portion core metal 4 according to this embodiment is an aluminum alloy having a coefficient of thermal expansion of $23.5 \times 10^{-6}/°C$.

Figure 9:
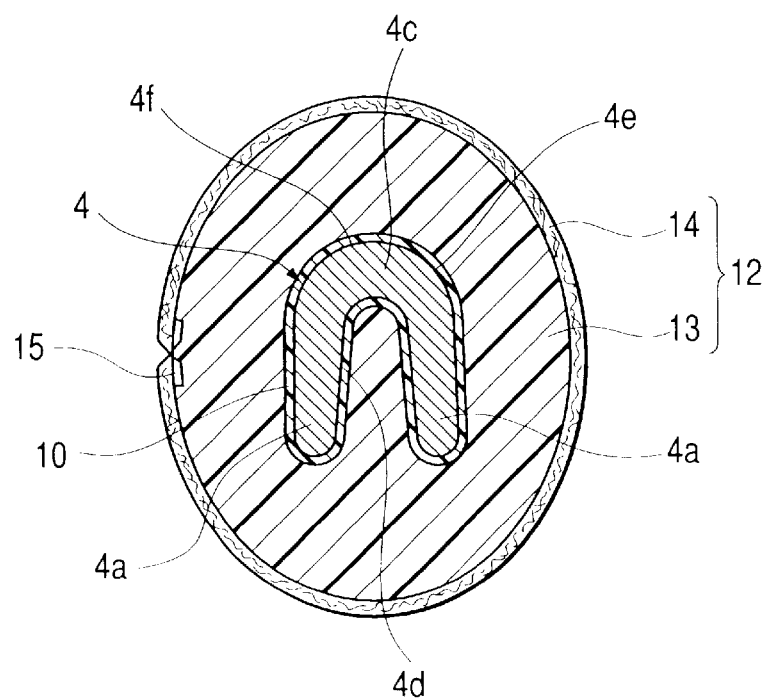
FIG. 9 is a cross sectional view taken along line III—III shown in FIG. 7.
Figure 10:
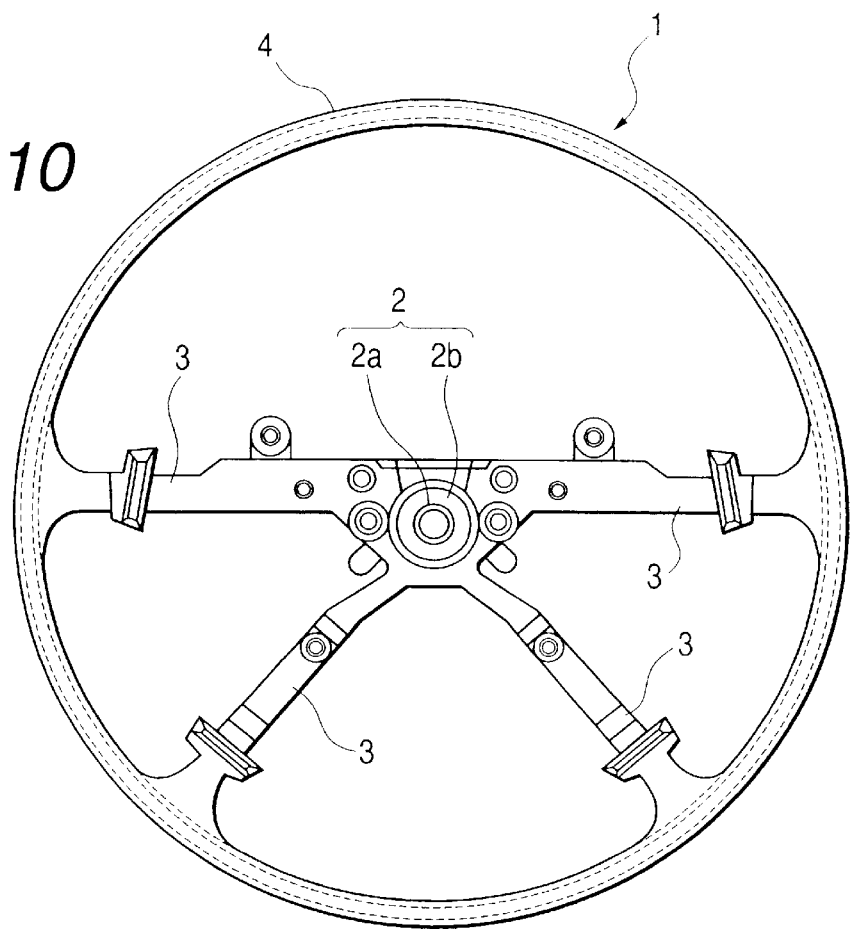
FIG. 10 is a plan view showing a core metal of a steering wheel according to the second embodiment.

As shown in FIG. 9, the ring-portion core metal 4 has an inverted U-shape cross sectional shape.

Figure 8:
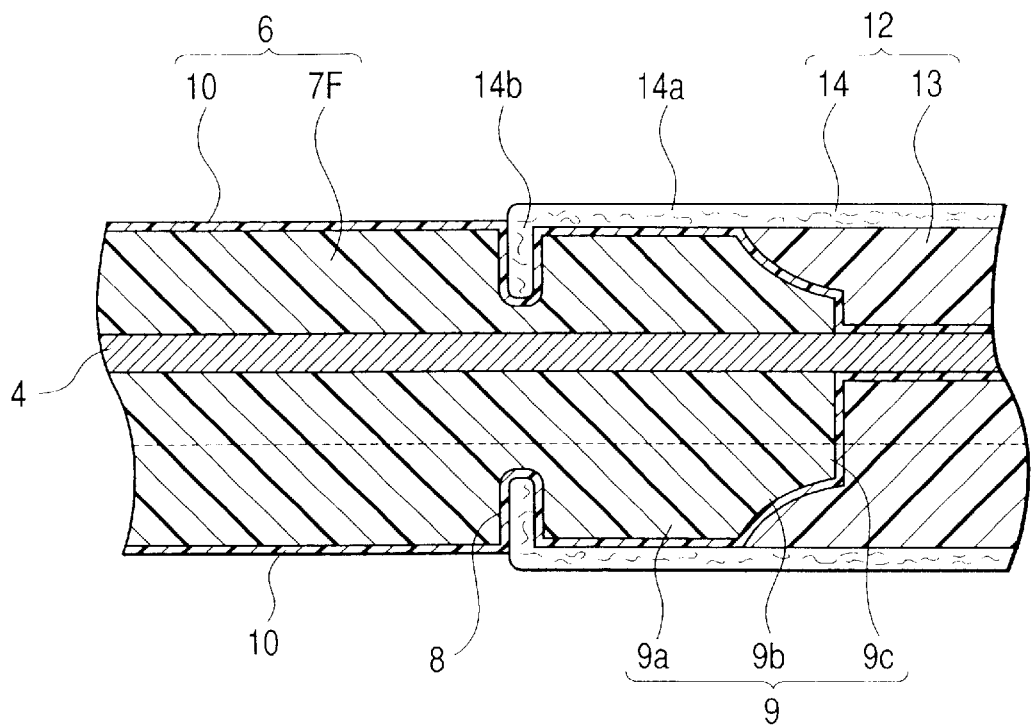
FIG. 8 is a cross sectional view taken along line VIII—VIII shown in FIG. 7.

As shown in FIGS. 7 to 9, the ring portion R has two hard portions 6 (6F and 6B) made of hard synthetic resin and soft portions 12 (12R and 12L) made of soft synthetic resin softer than the hard portions 6, the hard portions 6 and the soft portion 12 being alternately disposed around the ring-portion core metal 4 in the planar circumferential direction of the ring portion R. The hard portion 6 incorporates a body 7 (7F and 7B) which covers the ring-portion core metal 4 and which is made of hard synthetic resin; and a decorative layer 10 provided for the outer surface of the body 7 and having a woodgrain finish printed by hydraulic pressure transfer. The soft portion 12 incorporates a soft-portion body 13 which covers the ring-portion core metal 4 and which is made of soft synthetic resin; and a leather 14 sewed to the outer surface of the soft-portion bodies 13.

In this embodiment, the decorative layer 10 extends to a portion around the ring-portion core metal 4 as well as the body 7 of the hard portion 6 to easily perform the manufacturing process.

In this embodiment, the hard-portion bodies 7 are made of polypropylene having a coefficient of thermal expansion of $17.7 \times 10^{-5}/°C.$, while the soft-portion bodies 13 are made of foamed urethane.

In this embodiment, the hard portion 6 is disposed in front of the ring portion R in a direction in which the vehicle is steered straight and in the rear of the same. The soft portion 12 is disposed on the right and left of the ring portion R in the direction in which the vehicle is steered straight. Moreover, the soft portions 12 extend to the position of the right and left spokes S adjacent to the ring portion R.

Each leading end of the bodies 7 of the hard portions 6F and 6B in the planar circumferential direction of the ring portion R is provided with a support portion 9 having a woodgrain groove 8 and arranged to support a leather end 14a of the leather 14, as shown in FIGS. 7 and 8. Each of the support portions 9 incorporates a support surface 9a formed into a cylindrical shape and arranged to be brought into contact with the reverse side of the leather 14 to support the leather end 14a; and a tapered portion 9b tapered toward the leading end.

The woodgrain groove 8 is formed into an annular shape in the cross-sectional circumferential direction of the hard-portion body 7 to receive each end 14b of the leather 14.

The leathers 14 are, as shown in FIG. 9, sewed on the inside of the ring portion R adjacent to the boss portion B by using a sewing thread 15.

The process for manufacturing the steering wheel W according to this embodiment will now be described. The steering-wheel core metal 1 is previously manufactured. The steering-wheel core metal 1 is manufactured such that the boss 2a is introduced into a predetermined die-casting mold to die-cast the steering-wheel core metal 1. The die-cast steering-wheel core metal 1 is in a state shown in FIG. 10.

Then, the steering-wheel core metal 1 is introduced into a mold for molding the hard-portion bodies 7, and then the mold is closed. Then, the material for molding the body 7 is injected so that the body 7 having the woodgrain groove 8 and the support portion 9 is molded.

Then, the member is released from the mold for molding the hard-portion body 7. Then, the boss-portion core metal 2 of the steering-wheel core metal 1 is masked. Then, the decorative layer 10 is provided for a portion including the woodgrain grooves 8 of the hard-portion bodies 7 except for the boss-portion core metal 2 by hydraulic pressure transfer.

Then, the making material is removed, and then the steering-wheel core metal 1 having the hard portions 6 is introduced into the mold for molding the soft-portion bodies 13. Then, the mold is closed, and then the material for molding the soft-portion body 13 is injected so that the soft-portion bodies 13 are molded. The mold surface of the mold for molding the soft-portion body 13 presses the outer surface of the support surface 9a of the support portion 9 of the hard-portion body 7 when the mold has been closed.

Then, the soft-portion body 13 is released from the mold, and then the leather 14 is sewed to each of the soft-portion bodies 13. At this time, the end 14b is introduced into the woodgrain groove 8 provided for the hard-portion body 7 while the end 14a of the leather 14 is being brought into contact with the outer surface of the support surface 9a of the support portion 9 of the hard-portion body 7 such that the decorative layer 10 is interposed. Then, the sewing thread 15 is used to provide the leathers 14 for the soft portions 12. If necessary, an adhesive agent for bonding leather may be applied to the tapered portion 9b and the soft-portion body 13 when the leather 14 is sewed.

Then, a lower cover and a pad P (not shown) are joined to the lower and upper portions of the boss portion B so that the steering wheel W is manufactured. The steering wheel W can be joined to the vehicle. When the steering wheel is joined to the vehicle, the steering wheel W is secured to the steering shaft with a nut. Therefore, the steering wheel W is joined to the vehicle in a state in which the pad P has been removed. Then, the pad P is joined after the steering wheel W has been joined.

The steering wheel W according to this embodiment incorporates the ring-portion core metal 4 made of die-cast metal which is an aluminum alloy. The coefficient of thermal expansion of the ring-portion core metal 4 is two times or more the coefficient of thermal expansion of a conventional steel pipe (the conventional steel pipe has a coefficient of thermal expansion of $12.1 \times 10^{-6}/°C.$, while the aluminum alloy has a coefficient of thermal expansion of $23.5 \times 10^{-6}/°C.$) Therefore, the coefficient of thermal expansion of the ring-portion core metal 4 is close to the coefficient of thermal expansion of the hard-portion body 7 constituting the hard portion 6 and made of the hard synthetic resin (polypropylene has a coefficient of thermal expansion of $17.7 \times 10^{-6}/°C.$) Therefore, if the steering wheel W is allowed to stand in the cabin of a vehicle, the temperature of which is raised considerably, the hard portion 6 cannot easily be cracked. Moreover, no influence is exerted on the decorative layer 10 of the ring portion R. Therefore, the durability, and more particularly, weather resistance can be improved.

The steering wheel W according to this embodiment incorporates the ring-portion core metal 4 which has the inverted U-shape cross section to have a large surface area. Therefore, the ring-portion core metal 4 easily absorbs heat conducted from the hard portion 6. Moreover, absorbed heat can easily be conducted from the ring-portion core metal 4 to the steering shaft and the like through the spoke-portion core metal 3 and the boss-portion core metal 2 so that the temperature of the hard portion 6 is easily lowered. As a result, thermal expansion of the hard portion 6 can be prevented. Thus, cracks of the hard portion 6 can furthermore easily be prevented.

The ring-portion core metal 4 according to this embodiment is made of the aluminum alloy having a thermal conductivity (at 20° C.) of 0.53 cal·cm$^{-1}$·s$^{-1}$°C.$^{-1}$ which is larger than the thermal conductivity (0.18 cal·cm$^{-1}$·s$^{-1}$°C.$^{-1}$) of the conventional steel pipe. Therefore, heat of the hard portion 6 can furthermore easily be dispersed. Therefore, the foregoing effect can be enhanced.

Hence it follows that the steering wheel W according to this embodiment permits the structure that the ring portion R is constituted by disposing the hard portion 6 made of the hard synthetic resin and the soft portion 12 made of the soft synthetic resin softer than the hard portion 6 around the ring-portion core metal 4 in the planar circumferential direction of the ring portion R. If the foregoing structure is employed, formation of a crack of the hard portion 6 can be prevented.

In this embodiment, the ring-portion core metal 4 is made of die-cast metal obtained by die-casting the aluminum alloy. When die-cast metal having a coefficient of thermal expansion of $20 \times 10^{-6}/°C$ or larger is employed to constitute the ring-portion core metal 4, the coefficient of thermal expansion of the ring-portion core metal 4 can be made to be about two times or more the coefficient of thermal expansion of the conventional steel pipe because the conventional steel pipe has a coefficient of thermal expansion of $12.1 \times 10^{-6}/°C$. Therefore, the coefficient of thermal expansion of the ring-portion core metal 4 can be made closer to the coefficient of thermal expansion of the hard-portion body 7. Therefore, if the steering wheel is allowed to stand in a cabin of a vehicle, the temperature of which is raised considerably, the hard portion cannot easily be cracked.

Therefore, other die-cast metal may be employed, for example, a magnesium alloy having a coefficient of thermal expansion of $26.0 \times 10^{-6}/°C$. may be employed. The magnesium alloy has a thermal conductivity (20°C.) of 0.38 $cal \cdot cm^{-1} \cdot s^{-1} °C.^{-1}$ which is larger than the thermal conductivity (0.18 $cal \cdot cm^{-1} \cdot s^{-1} °C.^{-1}$) of the steel pipe. Therefore, the ring-portion core metal 4 may be constituted by die-casting using the magnesium alloy.

It is preferable that the thermal conductivity (at 20° C.) of the employed die-cast metal is 0.30 $cal \cdot cm^{-1} \ ^{1}°C.^{-1}$ or greater.

In this embodiment, the hard portion 6 incorporates the body 7 and the decorative layer 10 for coating the body, the decorative layer 10 being formed by printing process of hydraulic pressure transfer. A predetermined coating material may be applied to the body 7 to form the decorative layer 10. An individual decorative material, such as a woody material, may be bonded to the outer surface of the hard-portion body 7 to form the decorative layer 10. The hard portion 6 may be constituted by only the body 7 which does not have the decorative layer 10.

Similarly, in this embodiment, the soft portion 12 incorporates the body 13 and the leather 14 for covering the body 13. The soft portion 12 may be constituted by only a body 13 which does not have the leather 14.

The ring portion R according to this embodiment incorporates two hard portions 6 and two soft portions 12. The number of each of the hard portion 6 and the soft portion 12 may be one or three if the hard portion 6 and the soft portion 12 are disposed in the planar circumferential direction of the ring portion R. The foregoing numbers may arbitrarily be determined to correspond to the number of the spokes S or the like.

In the foregoing embodiment, the right and left soft portions 12R and 12L have the same volumes.

On the other hand, the front and rear hard portions 6F and 6B according to this embodiment are structured such that the volume of the front hard portion 6F is larger than that of the rear hard portion 6B.

Figure 13:
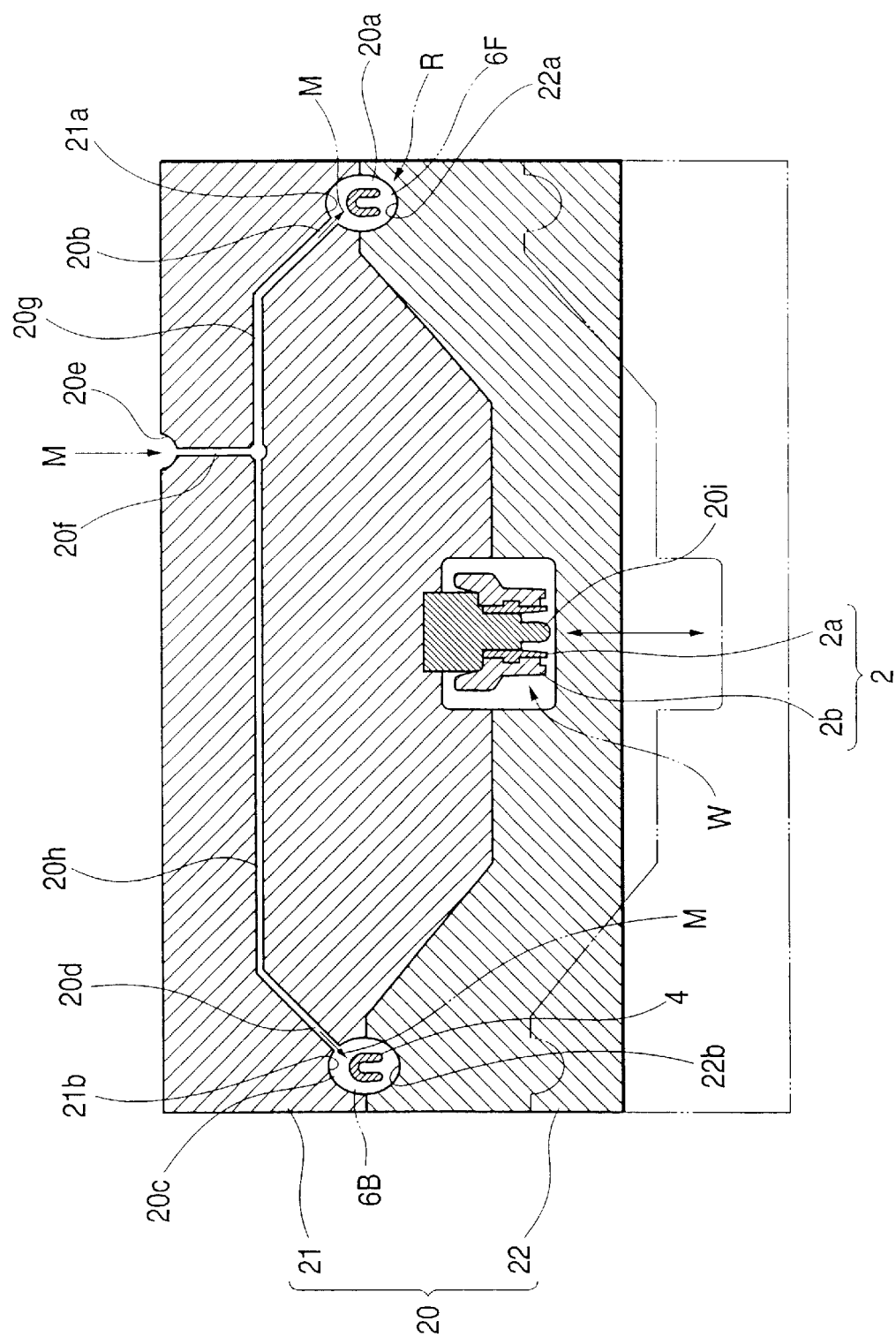
FIG. 13 is a schematic cross sectional view showing a mold for use in the foregoing embodiment.

A mold 20 for injection-molding each of the hard portions 6F and 6B will now be described. As shown in FIG. 13, the mold 20 incorporates two split molds 21 and 22 which are opened in the vertical direction of the steering wheel W. The split molds 21 and 22 incorporate molding surfaces 21a, 21b, 22a and 22b for forming cavities 20a and 20c which are able to mold the hard portions 6F and 6B after the mold has been closed. Molding surfaces 21a and 22a mold the front hard portion 6F, while molding surfaces 21b and 22b mold the rear hard portion 6B.

The upper split mold 21 has a nozzle touch 20e into which a nozzle of an injection molding machine is inserted. One sprue 20f is allowed to communicate with the nozzle touch 20e. Moreover, runners 20g and 20h allowed to communicate with the gates 20b and 20d for injecting the material for molding into the cavities 20a and 20c are allowed to communicate with the one sprue 20f.

Figure 12:
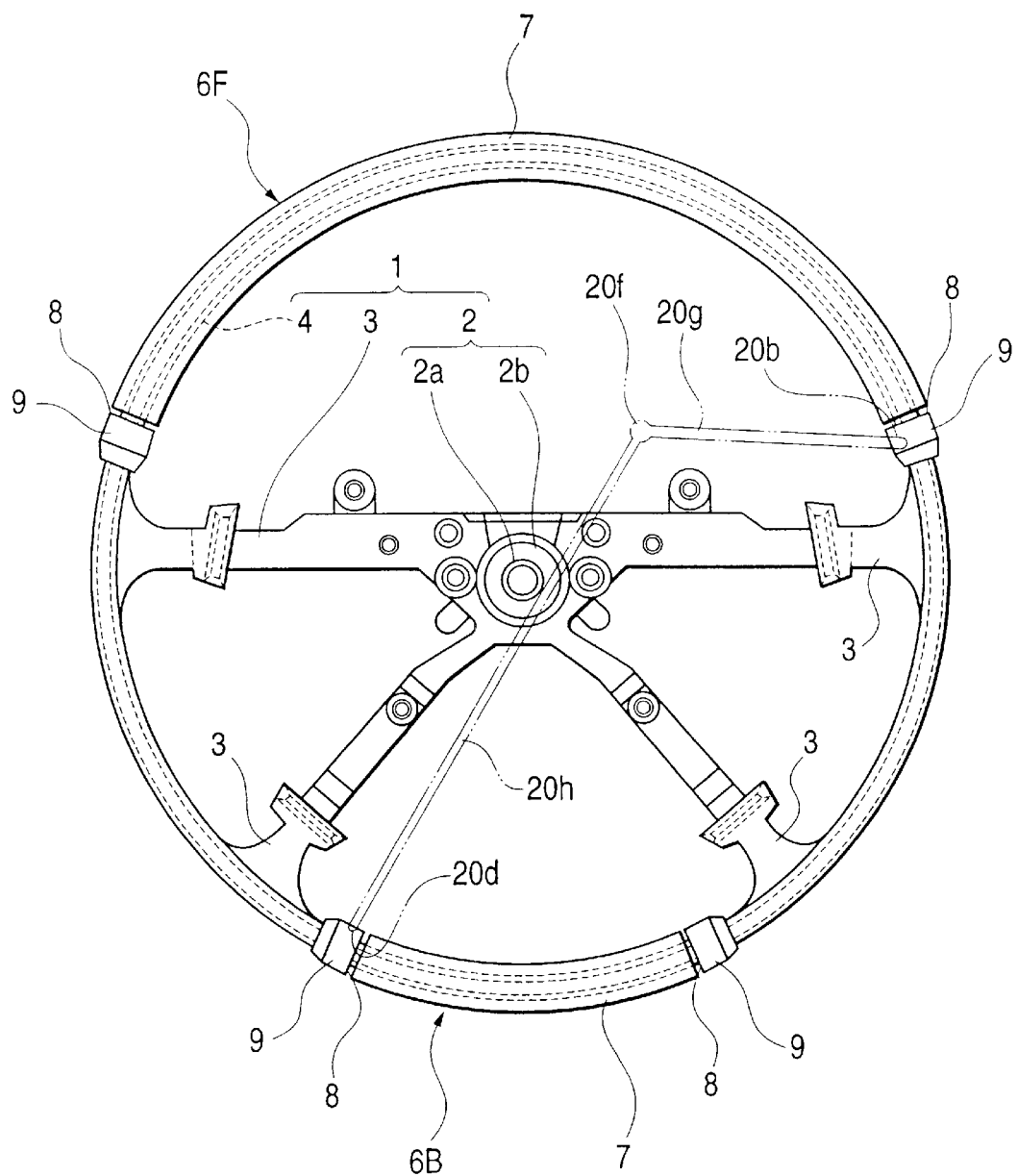
FIG. 12 is a plan view showing a state in which a hard coating portion has been formed around the core metal of the ring portion according to the embodiment by injection molding.

To make time required to complete injection of the material for molding into each of the cavities 20a and 20c to be substantially the same, this embodiment is structured such that the resistance of the material for molding which is allowed to pass through the runners 20g and 20h is changed to be inversely proportional to the volumes of the hard portions 6F and 6B. Specifically, as shown in FIGS. 12 and 13, the resistance of the material for molding which passes through the runner 20g for molding the hard portion 6F having the large volume is made to be lower by shortening the length of the runner 20g and by enlarging the cross sectional area of the opening. To make the resistance of the material for molding which passes through the runner 20h for molding the hard portion 6B having the small volume to be high, the runner 20h has a long length and a small cross sectional area of the opening thereof.

Figure 11:
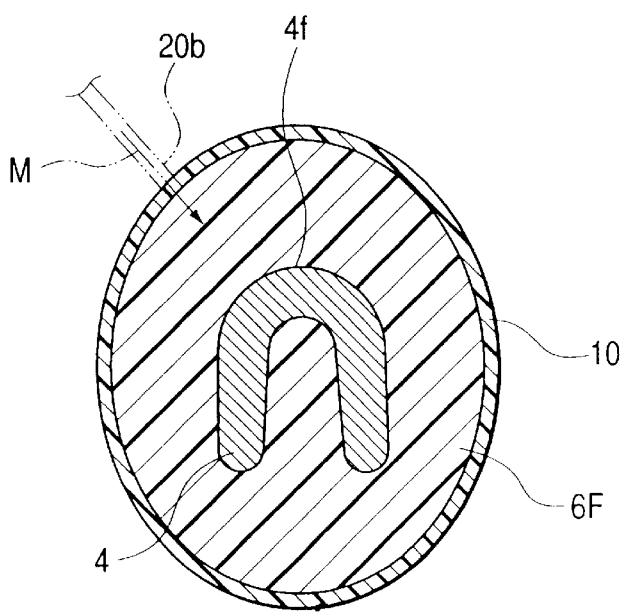
FIG. 11 is a cross sectional view taken along line XI—XI shown in FIG. 7.

Each of gates 20b and 20d for injecting the material for molding the hard portions 6F and 6B into the cavities 20a and 20c is opened in each of the support portions 9 which are the ends in the planar circumferential direction of the ring portion of the hard portions 6F and 6B, as indicated with alternate long and two short dashes lines shown in FIG. 12. Each of the gates 20b and 20d is opened above the ring-portion core metal 4 to cause the material M for molding introduced into the cavities 20a and 20c to flow along the upper surface 4f (see FIGS. 9 and 11) of the ring-portion core metal 4.

The split mold 21 has a set pin 20i to be engaged to the boss 2a of the steering-wheel core metal 1.

A method of manufacturing the steering wheel W by using the mold 20 will now be described. As described above, the steering-wheel core metal 1 is previously manufactured.

Then, the boss 2a is engaged to the set pin 20i of the opened mold 20 so that the steering-wheel core metal 1 is introduced into the split mold 21. Then, the mold is closed to inject the material M for molding the bodies 7 of the hard portions 6F and 6B into the cavities 20a and 20c from the injection molding machine through the sprue 20f and the runners 20g and 20h. Thus, the bodies 7 of the hard portions 6F and 6B having the woodgrain groove 8 and the support portion 9 are collectively molded.

At this time, the resistance of the material M for molding which passes through the runner 20g is low and the resistance of the material M for molding which passes through the runner 20h is high. Therefore, time required to-complete injection of the material M for molding into the mold 20 for molding the body 7 of the hard portion 6F having the large volume can be shortened. On the other hand, time required to complete injection of the material M for molding into the cavity 20c for molding the body 7 of the hard portion 6B having the small volume can be elongated. Therefore, time required to complete injection of the material M for molding into the cavities 20a and 20c can be made to be substantially the same.

Therefore, the operation of the injection molding machine can be interrupted to correspond to the time required to complete the injection. When the operation of the injection molding machine has been interrupted, the injecting pressure is not applied to the inside portion of each of the cavities 20a and 20c. Therefore, formation of burrs in the vicinity of each of the hard portions 6F and 6B can be prevented.

In this embodiment, the material M for molding injected into the cavities 20a and 20c through the gates 20b and 20d conflicts with the upper surface 4f of the ring-portion core metal 4 so that the material M for molding flows along the upper surface 4f. Then, the material M for molding is charged by a certain quantity in the portion adjacent to the upper surface 4f. Then, the material M for molding flows toward the lower surface of the ring-portion core metal 14. Therefore, formation of a weld mark on the upper surface of the ring-portion core metal 4 can be prevented.

Then, the mold is opened, and then an operation for removing burrs is performed. Then, the boss-portion core metal 2 of the steering-wheel core metal 1 is masked to form the decorative layers 10 in the portion including the bodies 7 of the hard portions 6F and 6B except for the boss-portion core metal 2 by hydraulic pressure transfer.

Then, the mask material is removed, and then the steering-wheel core metal 1 having the hard portions 6F and 6B is introduced into the mold for molding the soft-portion body 13. Then, the mold is closed, and then the material for molding the soft-portion body 13 is injected so that the soft-portion bodies 13 of the soft portions 12R and 12L are molded. The surface of the mold for molding the soft-portion body 13 is brought to a state in which the surface presses the outer surface of the support surface 9a of the support portion 9 of the hard portion 6.

Then, the soft-portion body 13 is released from the mold, and then the operation for removing burrs is performed. Then, the leather 14 is sewed to a portion around each soft-portion body 13. At this time, the end 14b is engaged to the woodgrain groove 8 provided for the hard portion 6 while the leather end 14a of the leather 14 is being brought into contact with the outer surface of the support surface 9a of the support portion 9 of the hard portion 6 through the decorative layer 10. Then, the sewing thread 15 is used to locate the leathers 14 to the position of the soft-portion body 13. If necessary, an adhesive agent for bonding leather may be applied to the tapered portion 9b and the soft-portion body 13 when the soft-portion body 13 sewed.

The above-mentioned method of manufacturing the steering wheel W according to this embodiment is structured such that time required to complete injection of the material M for molding into the cavities 20a and 20c of the mold 20 for molding the hard portions 6F and 6B are made to be substantially the same when the hard portions 6F and 6B are molded which are sectioned and which have different volumes. Since the hard portions 6F and 6B are molded as described above, the operation of the injection molding machine can be interrupted to correspond to the time required to complete the injection. When the operation of the injection molding machine is interrupted, no injection pressure is applied to each of the cavities 20a and 20c. Therefore, formation of burrs in the vicinity of the hard portions 6F and 6B can be prevented. As a result, the operation for removing burrs which is performed after the molding process has been completed can be facilitated.

The resistance of the material M for molding which passes through the runners 20g and 20h for molding the hard portions 6F and 6B is changed to be inversely proportional to the volumes of the hard portions 6F and 6B. In this embodiment, the foregoing change is realized by adjusting the lengths and the cross sectional areas of the openings of the runners 20g and 20h. Only the lengths of the runners 20g and 20h may be adjusted or only the cross sectional areas of the openings of the runners 20g and 20h may be adjusted.

When the cross sectional areas of the openings of the runners 20g and 20h are adjusted, the cross sectional areas of the openings are unformed for the overall lengths in this embodiment. As an alternative to this, one or a plurality of weirs or the like may partially be provided to reduce the cross sectional areas of the runners 20g and 20h. Thus, the resistance of the material M for molding which passes through each of the runners 20g and 20h is adjusted.

When time required to inject the material M for molding into each of the cavities 20a and 20b of the mold 20 for molding each of the hard portions 6F and GB is made to be substantially the same, an accumulating portion for accumulating the material for molding may be provided for the runner 20h for molding the hard portion 6B having the small volume to mold the hard portions 6F and 6B.

Figure 14:
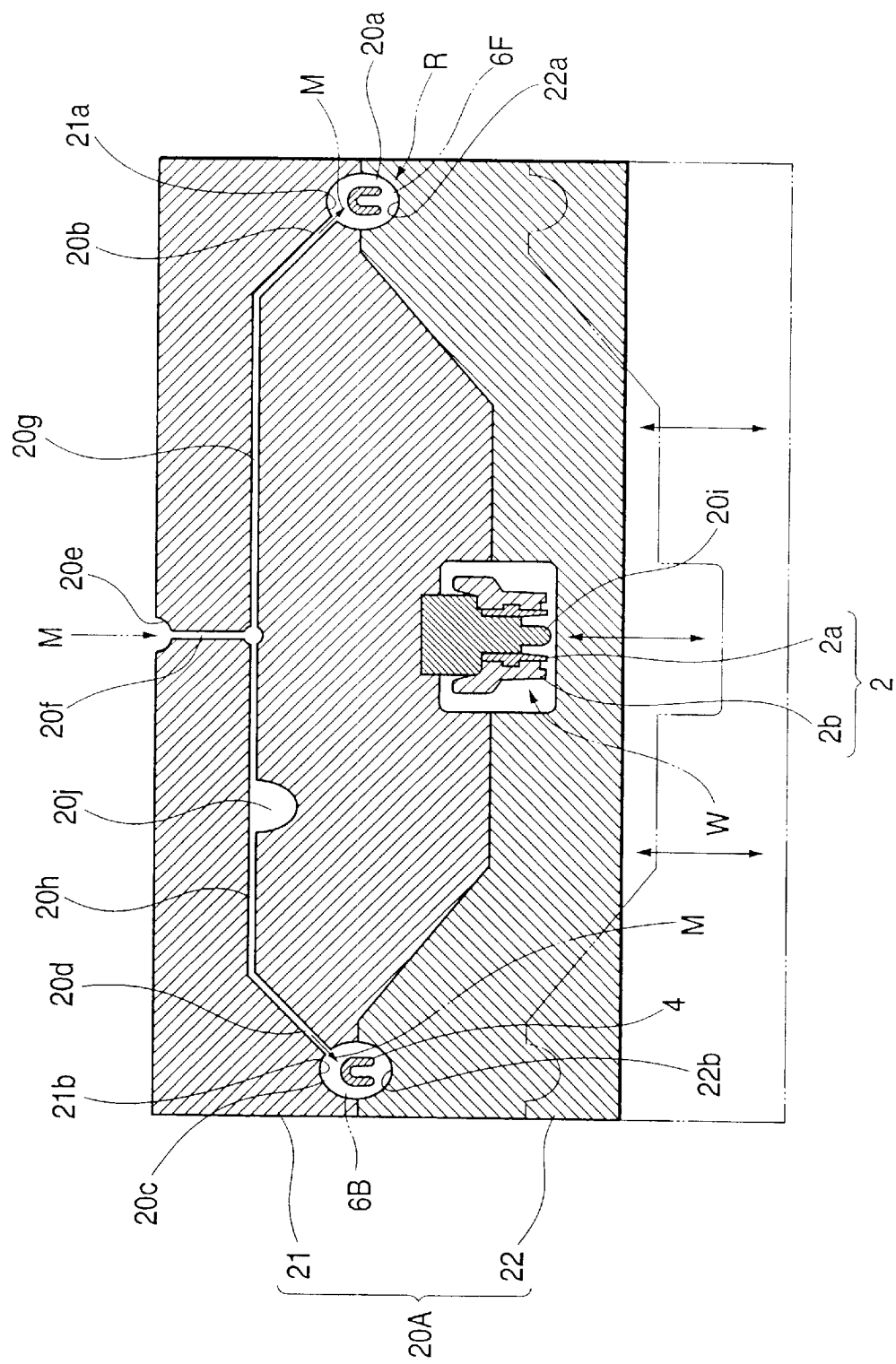
FIG. 14 is a schematic cross sectional view showing another example of the mold according to the embodiment.

That is, a mold 20A shown in FIG. 14 has a structure that an accumulating portion 20j is provided for the runner 20h of the runners 20g and 20h extending from one sprue 20f to mold the hard portions 6F and 6B. If the runners 20g and 20h have the same capacity, the capacity of the accumulating portion 20j is the difference between the volume of the hard portion 6F and that of the hard portion 6B. As a matter of course, the capacity of the accumulating portion 20j may be determined in consideration of the difference in the capacity if the runners 20g and 20h have different capacities. While changing the resistance of the material M for molding which passes through each of the runners 20g and 20h, also the accumulating portion 20j may be provided as is employed in the foregoing embodiment.

When the molding operation is performed by using the foregoing mold 20A, time required to complete injection of the material into the cavity 20c for molding the hard portion 6B having the small volume can be elongated because the material for molding is accumulated in the accumulating portion 20j. Therefore, time required to complete injection of the material M for molding into the cavities 20a and 20c of the mold 20A can be made to be substantially the same. Therefore, formation of burrs around the hard portions 6F and 6B can be prevented similarly to the foregoing embodiment. As a result, an operation for removing burrs which is performed after the molding process has been performed can easily be performed.

In this embodiment, two hard portions 6F and 6B sectioned to have different volumes are provided for the ring portion R. Three or more hard portions may be provided to correspond to the number of the spokes S of the steering wheel W. If a plurality of the hard portions have the same volume, the present invention may be applied when some hard portions have difference in the volume. As a matter of course, the present invention may be applied if all of the hard portions have volumes which are different from one another.

Figure 15:
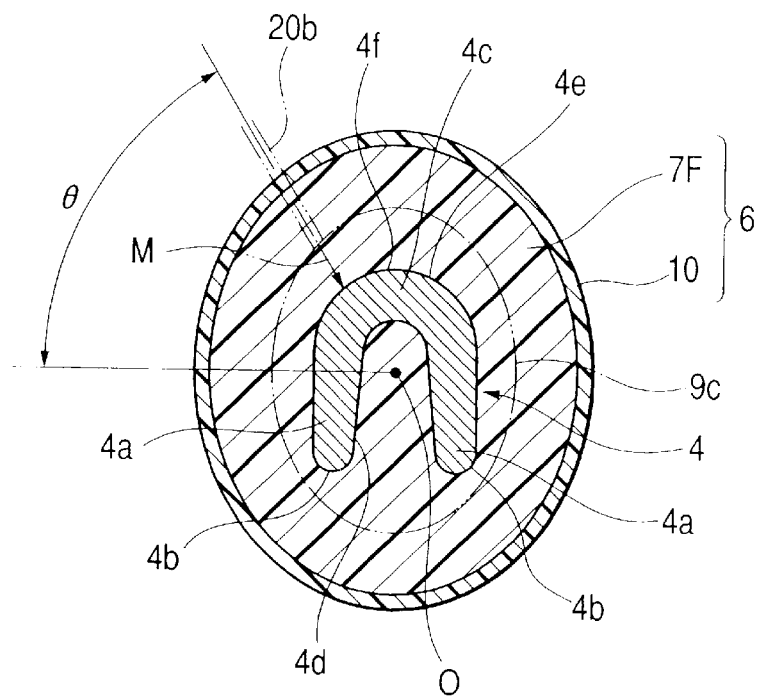
FIG. 15 is an alternative cross sectional view taken along line XI—XI shown in FIG. 7.

The cross sectional shape of the ring-portion core metal 4 will now be described. As shown in FIGS. 9 and 15, the cross sectional shape is formed such that the lower portion of the steering wheel W is opened by employing an inverted U-shape cross section which has the right and left side walls 4a and the ceiling wall 4c which connects the right and left side walls 4a to each other at the upper ends of the side walls 4a. The foregoing cross sectional shape is determined in consideration of the draft when the die-cast operation is performed. That is, the inner surface 4d of the cross sectional shape is opened downwards and the outer surface 4e is narrowed upwards. Note that the angle of narrowing of the outer surface 4e is a small angle of about 1°.

A casting mold for molding the steering-wheel core metal 1 incorporates two split molds which are opened in the vertical direction of the steering wheel W. At the position for casting the ring-portion core metal 4, split surface D (see FIG. 21) of the casting mold is located with reference to the position of the lower end surface 4b of each of the right and left side walls 4a. The casting surface of the upper split mold is used to cast the outer surface 4e of the right and left side walls 4a and the ceiling wall 4c. The casting surface of the lower split mold is used to cast the lower end surface 4b of the right and left side walls 4a and the inner surface 4d of the side walls 4a and the ceiling wall 4c.

As described above, the hard portion 6 incorporates the body 7 and the decorative layer 10 having the woodgrain finish printed on the outer surface of the body 7 by the hydraulic pressure transfer.

Figure 16:
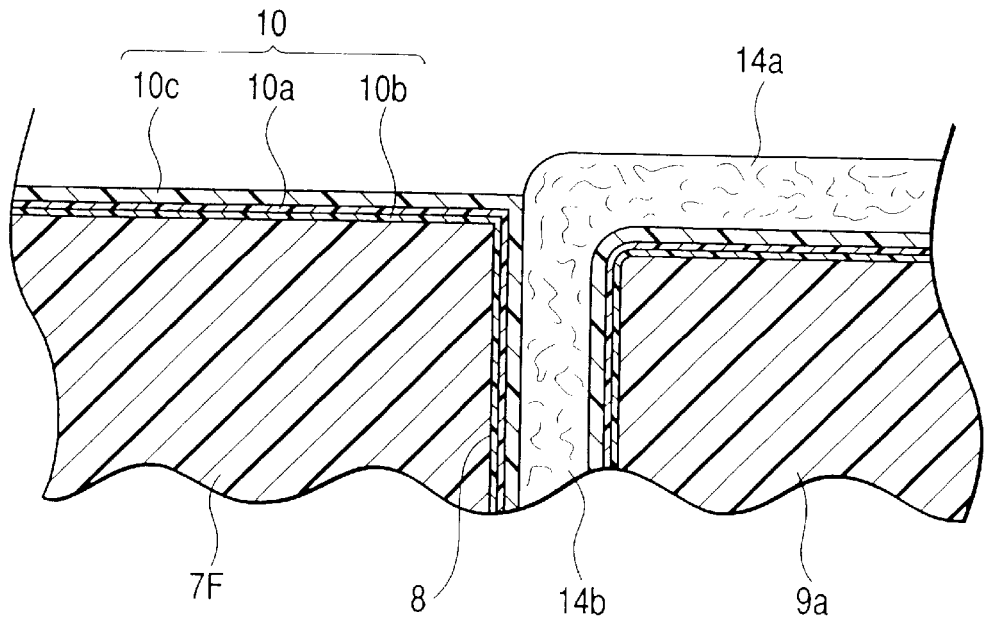
FIG. 16 is an enlarged cross sectional view showing the surface of the body Of a hard portion serving as a coating layer according to the embodiment.
Figure 17:
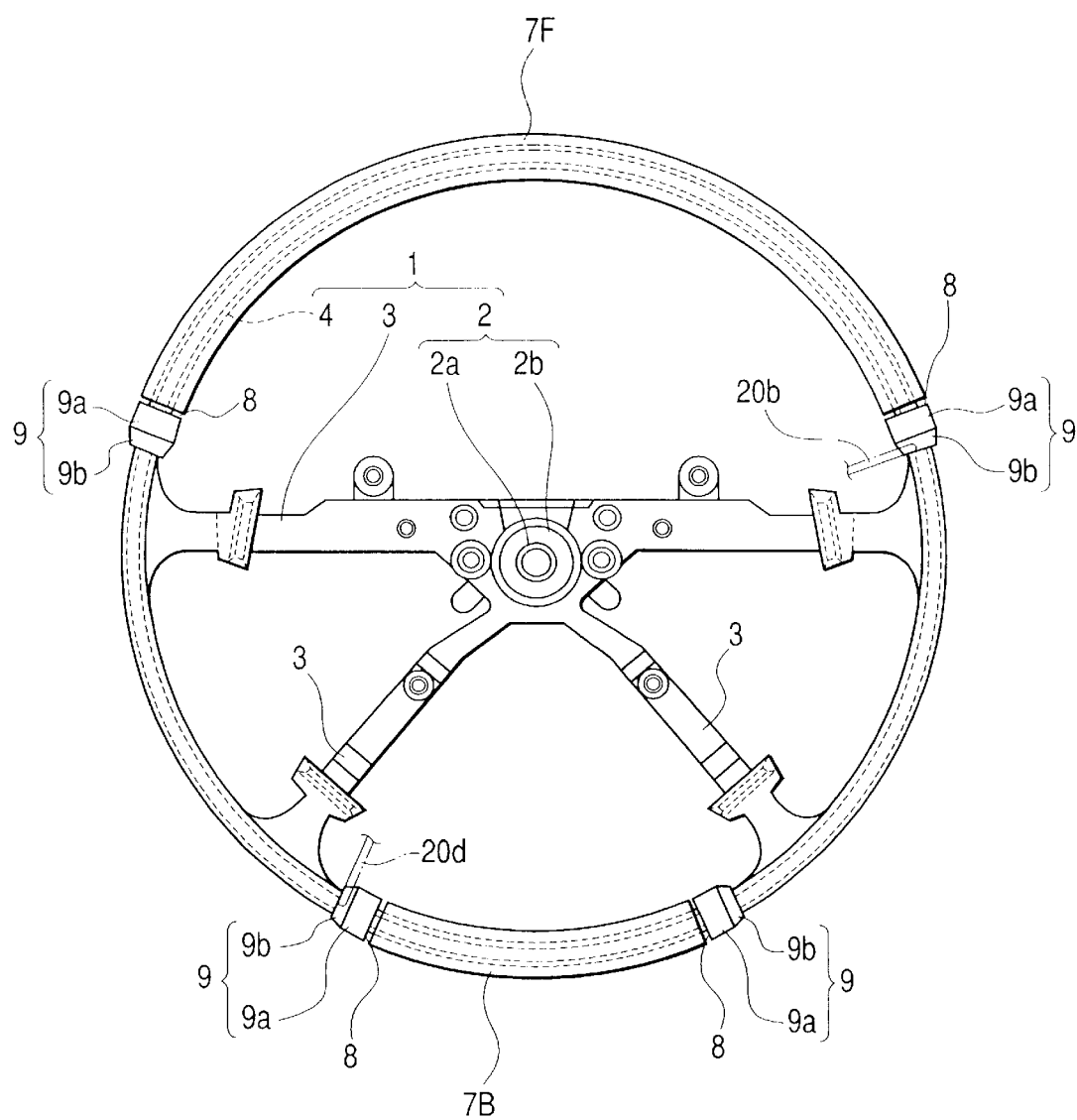
FIG. 17 is a plan view showing a state in which the body of the hard portion serving as a coating layer has been formed around the core metal of the ring portion according to this embodiment by injection molding.
Figure 18:
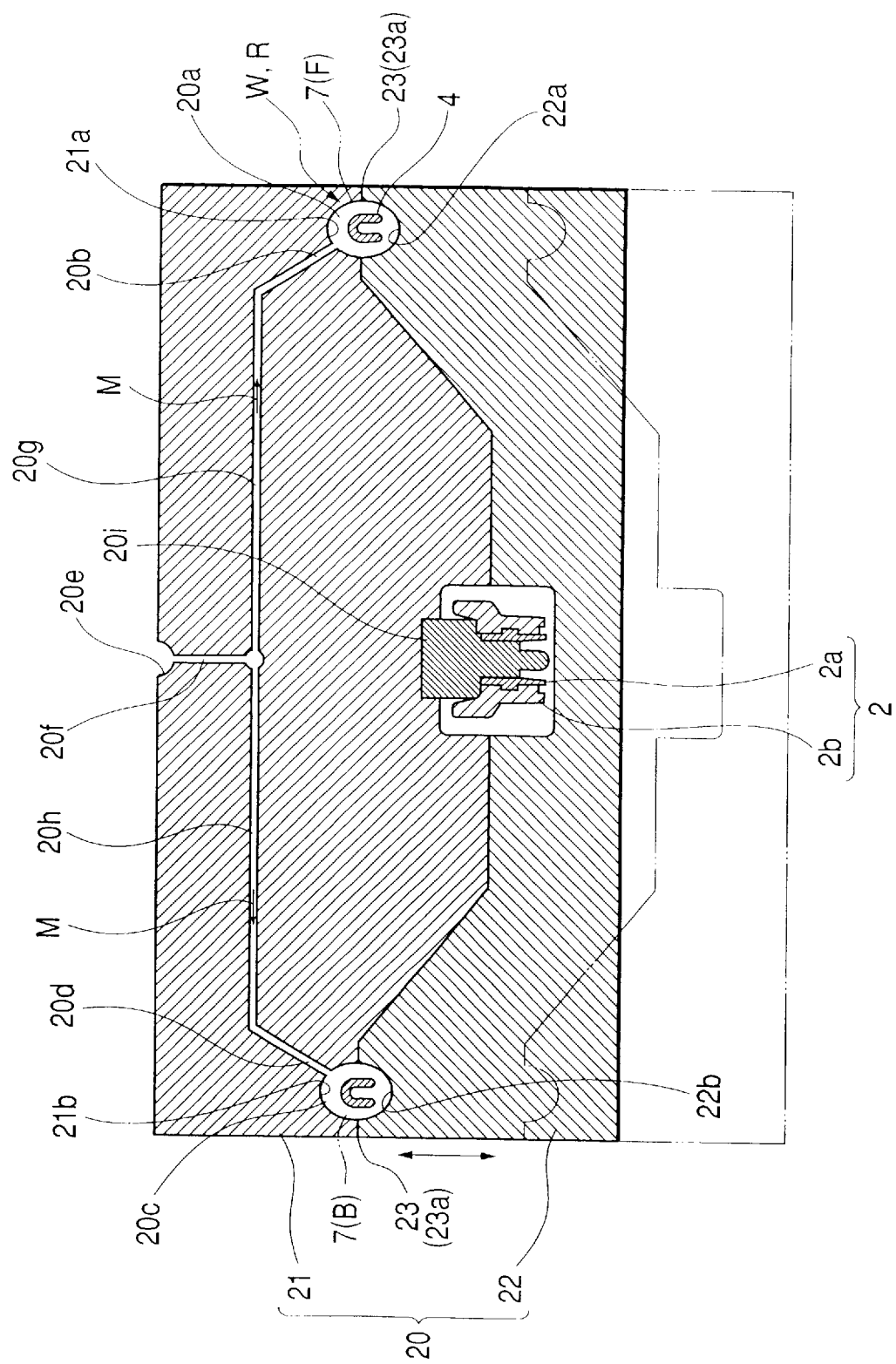
FIG. 18 is a schematic view showing another example of the mold for use in the embodiment.

The detailed structure of the decorative layer 10 will now be described. As shown in FIG. 16, the decorative layer 10 incorporates a printed layer 10a having a thickness of 1 μm to 3 μm and having the woodgrain finish pattern, a primer layer 10b for improving adhesiveness between the body 7 and the printed layer 10a and a transparent glossy layer 10c applied to protect the printed layer 10a and having a thickness of 10 μm to 40 μm. The glossy layer 10c is made of transparent polyurethane and acrylic resin or polyester resin.

As an alternative to the mold 20 shown in FIGS. 13 and 14, another example of the mold 20 shown in FIGS. 18 to 21 may be employed to injection-mold each of the hard-portion bodies 7F and 7B of the hard-portion body 7. The molding surfaces 21a and 22a mold the front hard-portion body 7F, while the molding surfaces 21b and 22b mold the rear hard-portion body 7B. Each of the molding surfaces 21a, 22a and 22b has an annular split projection (no reference numeral is given in the drawings) in which the woodgrain groove 8 can be formed.

Figure 19:
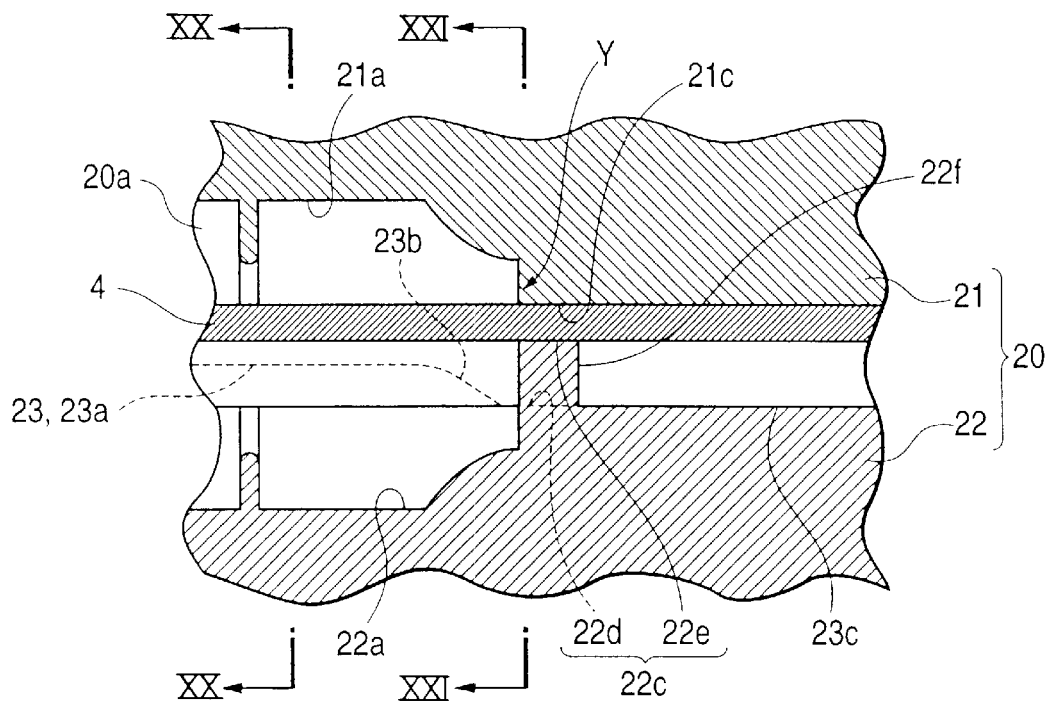
FIG. 19 is a cross sectional view showing a burr-removing portion of the mold shown in FIG. 18.
Figure 21:
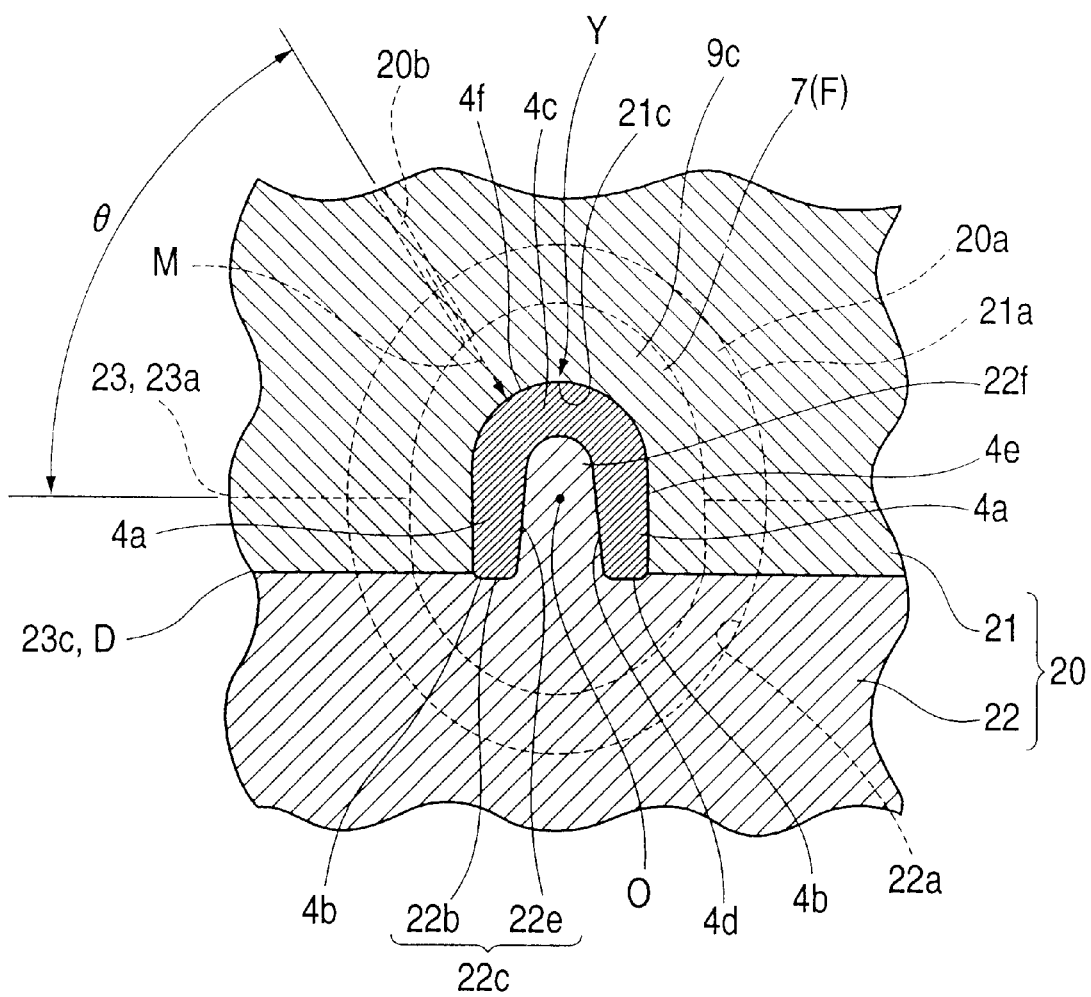
FIG. 21 is an alternative cross sectional view taken along line XXI—XXI shown in FIG. 19.

Each of the split molds 21 and 22 has burr-removing surfaces 21c and 22c formed continuously from molding surfaces 21a, 21b, 22a and 22b for molding the hard-portion bodies 7F and 7B and arranged to press the ring-portion core metal 4. The burr-removing molding surface 21c of the upper split mold 21 is, as shown in FIGS. 19 and 21, structured to forcible be brought into contact with the outer surface 4e of the two side walls 4a and the ceiling wall 4c in the cross section of the ring-portion core metal 4. The burr-removing molding surface 22c of the lower split mold 22 incorporates a side end surface 22d which can forcibly be brought into contact with the lower end surface 4b of the two side walls 4a and a side inner surface 22e which is forcibly brought into contact with the inner surface 4d of the two side walls 4a and the ceiling wall 4c. Note that the side inner surface 22e is provided for the outer surface of the projection 22f provided for the burr-removing portion Y.

Figure 20:
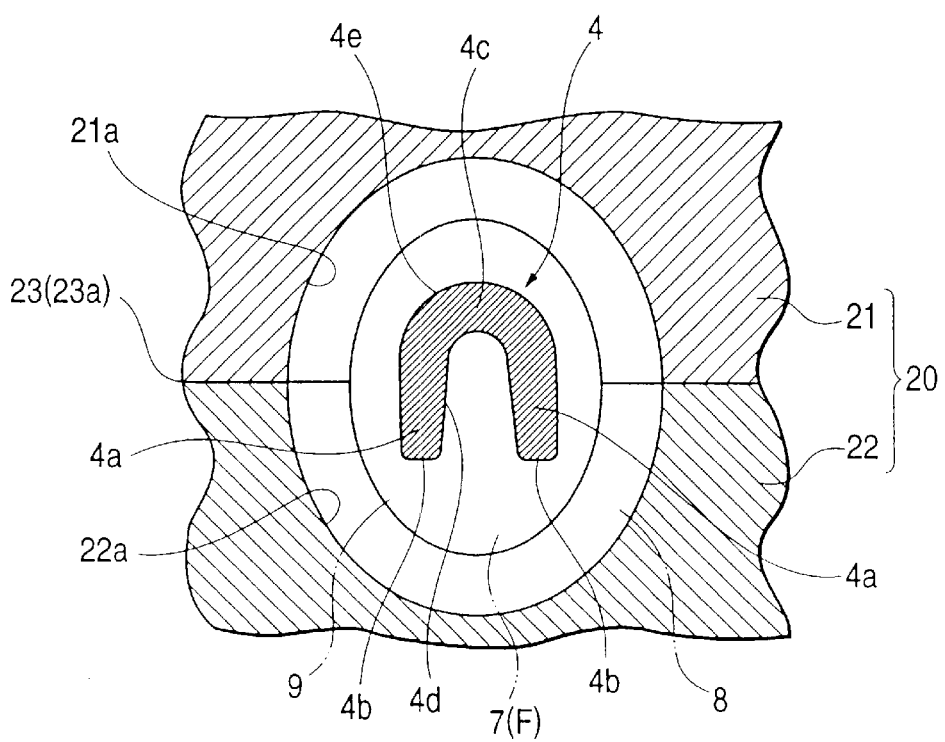
FIG. 20 is an alternative cross sectional view taken along line XX—XX shown in FIG. 19.

As shown in FIGS. 19 and 20, the, split surface 23 of the split molds 21 and 22 is disposed in a portion adjacent to the molding portion 23a for molding the hard-portion bodies 7F and 7B such that the draft of the hard-portion bodies 7F and 7B each having an eclipse cross sectional shape and the intermediate position of the hard-portion bodies 7F and 7B in the vertical direction is used as a reference. As shown in FIGS. 19 and 21, the split surface 23 is disposed in the portion adjacent to the pressing surface 23c of the burr-removing surfaces 21c and 22c such that the position of the lower end surface 4b of the two side walls 4a on the cross section of the ring-portion core metal 4 is used as a reference. Thus, the split surface 23 coincides with the split surface D of the casting mold for molding the steering-wheel core metal 1.

In the molding portion 23a of the split surface 23, an inclined portion 23b moderately inclined from the intermediate position of the hard-portion bodies 7F and 7B in the vertical direction toward the burr-removing portion Y is provided for the position of each support portion 9 of the hard-portion bodies 7F and 7B, as indicated with a dashed line shown in FIG. 19. Thus, the inclined portion 23b is continued from the molding portion 23a of the molding surfaces 21a, 21b, 22a and 22b to the pressing surface 23c of the burr-removing surfaces 21c and 22c.

Each of the gates 20b and 20d for injecting the material for molding the hard-portion bodies 7F and 7B which are the coating layers into the cavities 20a and 20c is formed in the leading end 9c of the support portion 9 which is the end in the planar circumferential direction of the ring portion of the hard-portion bodies 7F and 7B, as shown in FIGS. 15, 17, 18 and 21.

The gates 20b and 20d are disposed in the upper portion of the steering wheel W as compared with the molding portion 23a of the split surface 23 for molding the hard-portion bodies 7F and 7B of the two split molds 21 and 22. In this embodiment, the gates 20b and 20d are formed toward the central portion 0 of the cross section of the ring-portion core metal 4 and toward the position adjacent to the intersection between the side wall 4a and the ceiling wall 4c on the cross section of the ring-portion core metal 4 such that the angle θ from the right and left positions is about 50°, the gates 20b and 20d being provided for the upper split mold 21. Elements having the same reference numeral as those shown in FIGS. 13 and 14 are omitted from description.

A method of manufacturing the steering wheel W using the mold 20 shown in FIGS. 18 to 21 will now be described.

The process for molding the hard-portion bodies 7F and 7B is the same as that shown in FIG. 13.

Therefore, formation of a weld mark of the hard-portion bodies 7F and 7B adjacent to the upper surface 4f of the ring-portion core metal 4 can be prevented.

The decorative layer 10 is formed by hydraulic pressure transfer. The decorative layer 10 is formed by applying the primer layer 10b. Then, the printed layer 10a is formed by the hydraulic pressure transfer, and then the glossy layer 10c is applied. Then, the foregoing process is performed so that the hard portions 6F and 6B are formed.

The steering wheel W according to this embodiment incorporates the hard-portion bodies 7F and 7B which are coating layers which are partially disposed in the planar circumferential direction of the ring portion are molded such that the positions of the gates 20b and 20d when the molding process is performed are higher than the position of the molding portion 23a of the split surface 23 of the two split molds 21 and 22. Therefore, the material M for molding flows along the upper surface 4f of the ring-portion core metal 4. Thus, the position at which the material M for molding is fused on the lower surface as a substitute for the upper surface 4f of the ring-portion core metal 4. Therefore, if the hard-portion bodies 7F and 7B serving as the coating layers are formed by injection molding by using one gate 20b and 20d disposed adjacent to the ends of the hard-portion bodies 7F and 7B, formation of a weld mark of the hard-portion bodies 7F and 7B on the upper surface 4f of the ring-portion core metal 4 can be prevented.

This embodiment permits a structure that the cross sectional shape of the ring-portion core metal 4 is formed into the inverted U-shape cross sectional shape to open the lower portion of the steering wheel such that the right and left side walls 4a and the ceiling wall 4c for connecting the right and left side walls 4a at the upper ends of the right and left side walls 4a are provided. In the foregoing case, the material M for molding which has been injected into the cavities 20a and 20c through the gates 20b and 20d conflicts with the upper surface 4f of the ring-portion core metal 4. Thus, the material M for molding flows along the upper surface 4f so that the material M for molding in a certain quantity is charged in the portion on the upper surface 4f. Then, the material M for molding flows along the lower surface of the ring-portion core metal 4. Therefore, if the hard-portion bodies 7F and 7B serving as the coating layers are partially provided for the portion around the ring-portion core metal 4 having the inverted U-shape cross sectional shape, formation of a weld mark of the hard-portion bodies 7F and 7B on the core-metal upper surface 4f can be prevented. As a result, defective appearance of the hard-portion bodies 7F and 7B can be prevented.

As an alternative to the structure of this embodiment in which the ring-portion core metal 4 has the inverted U-shape cross sectional shape, the ring-portion core metal 4 may be constituted by a steel pipe or a steel rod to have a circular cross sectional shape or an eclipse cross sectional shape. In the foregoing case, the arrangement of the foregoing embodiment in which the gates 20b and 20d are disposed such that the material M for molding flows along the core-metal upper surface 4f is able to prevent formation of a weld mark on the upper surface 4f of the ring-portion core metal 4.

It is preferable that the positions of the gates 20b and 20c for causing the material M for molding to flow along the core-metal upper surface 4f to prevent formation of the weld mark on the core-metal upper surface 4f are determined such that angle θ with respect to the center O of the cross section of the core metal 4 is 5° to 175° including the upper position. If the angle is smaller than 5° or if the angle is larger than 175°, the material M for molding first flows to the lower surface of the core metal 4. Thus, there is apprehension that a weld mark is formed on the core-metal upper surface 4f.

When the ring-portion core metal 4 is formed to have the inverted U-shape cross sectional shape, this embodiment attains the following operation and effect. That is, if the material M for molding is first injected to the position adjacent to the inner surface 4d of the core metal 4, the material M for molding upwards pushes the ring-portion core metal 4. Thus, deviation of the ring-portion core metal 4 undesirably occurs. In this embodiment, the material M for molding is injected through the gates 20b and 20d formed above the ring-portion core metal 4 to downwards push the ring-portion core metal 4. Therefore, upward pushing of the ring-portion core metal 4 can be canceled so that deviation and deformation of the ring-portion core metal 4 are prevented.

In this embodiment, the thin printed layer 10a formed by hydraulic pressure transfer is interposed on the surface of the hard-portion bodies 7F and 7B serving as the coating layers to form a glossy coating film (the glossy layer 10c). Since no weld mark is formed on the hard-portion bodies 7F and 7B on the upper surface 4f of the core metal 4, deterioration in the appearance of the hard portions 6 of the ring portion R can be prevented.

In this embodiment, the glossy coating film 10c is provided for the surface of each of the hard-portion bodies 7F and 7B serving as the coating layers. As a matter of course, the hard portion 6 may be constituted by only the hard-portion bodies 7F and 7B.

In this embodiment, the split surface 23 of the mold 20 is made coincide with the split surface D of the casting mold for casting the ring-portion core metal 4 at the burr-removing portion Y at the end in the planar circumferential direction of the ring portion in the hard-portion bodies 7F and 7B serving as the coating layers.

Therefore, in the burr-removing portion Y, the burr-removing molding surface 22c of the lower split mold 22 is forcibly brought into contact with only the lower end surface 4b of the two side walls 4a of the ring-portion core metal 4 and the inner surface 4d of the side walls 4a and the ceiling wall 4c. The burr-removing molding surface 21c of the upper split mold 21 is forcibly brought into contact with only the outer surface 4e of the two side walls 4a and the ceiling wall 4c of the ring-portion core metal 4. Thus, locating along the draft of the ring-portion core metal 4 can easily be performed.

As a result, when the mold 20 is closed, the burr-removing surfaces 21c and 22c of the upper and lower split molds 21 and 22 are able to completely press the overall circumference of the ring-portion core metal 4 in the burr-removing portion Y. As a result, removal of burrs can easily be performed.

Figure 22:
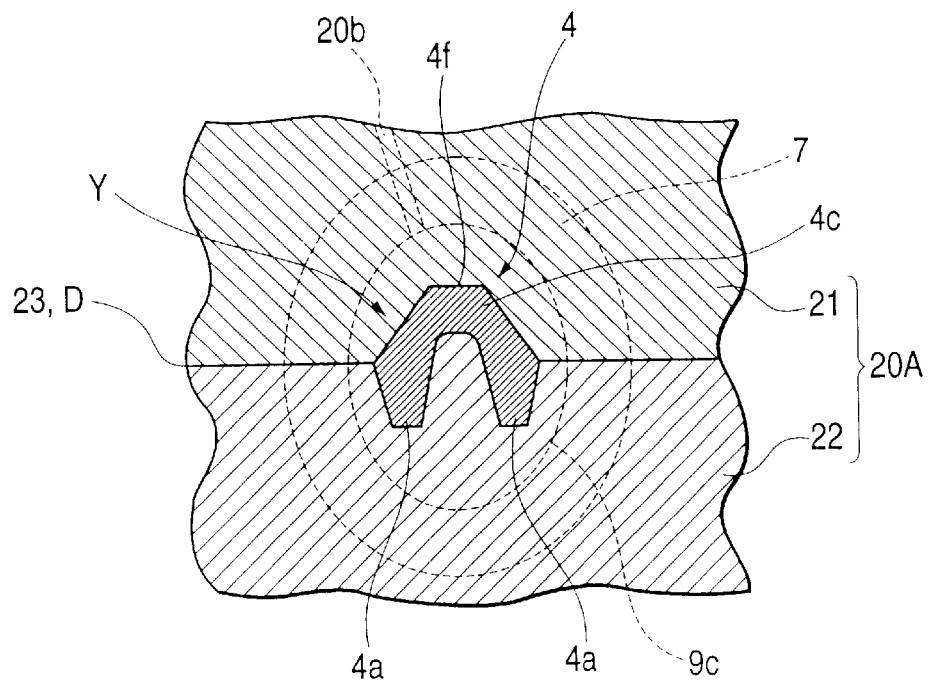
FIG. 22 is a cross sectional view showing a burr-removing portion of the mold according to another embodiment.
Figure 23:
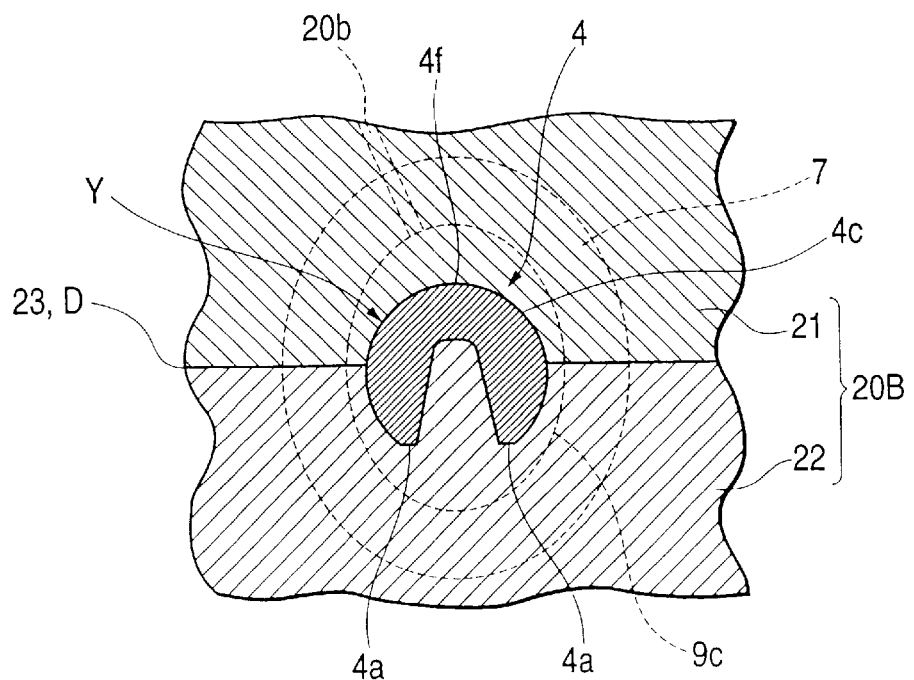
FIG. 23 is a cross sectional view showing the burr-removing portion of the mold according to another embodiment.

When the cross sectional shape of the ring-portion core metal 4 which is molded by die-casting is formed into the inverted U-shape cross sectional shape, a portion adjacent to the intermediate portion in the vertical direction of the outer surface of the right and left side walls 4a is gradually expanded as shown in FIGS. 22 and 23. When the steering-wheel core metal 1 is die-cast, the split surface 23 of the molds 20A and 20B is made coincide with the split surface D of the casting mold for casting the ring-portion core metal in the burr-removing portion Y at the end in the planar circumferential direction of the ring portion of the hard-portion body 7. Moreover, the split surface 23 is disposed at the position of the right and left side walls at which the maximum expansion is realized. Thus, removal of burrs can easily be performed.

In this embodiment, the ring-portion core metal 4 which is molded by die-casting has the inverted U-shape cross sectional shape. The ring-portion core metal 4 may be die-cast to have another cross sectional shape. Also in the foregoing case, the split surface of the molds at the burr-removing position is made coincide with the split surface of the casting mold for casting the ring-portion core metal. Thus, removal of burrs of the coating layer can easily be performed.

Figure 24:
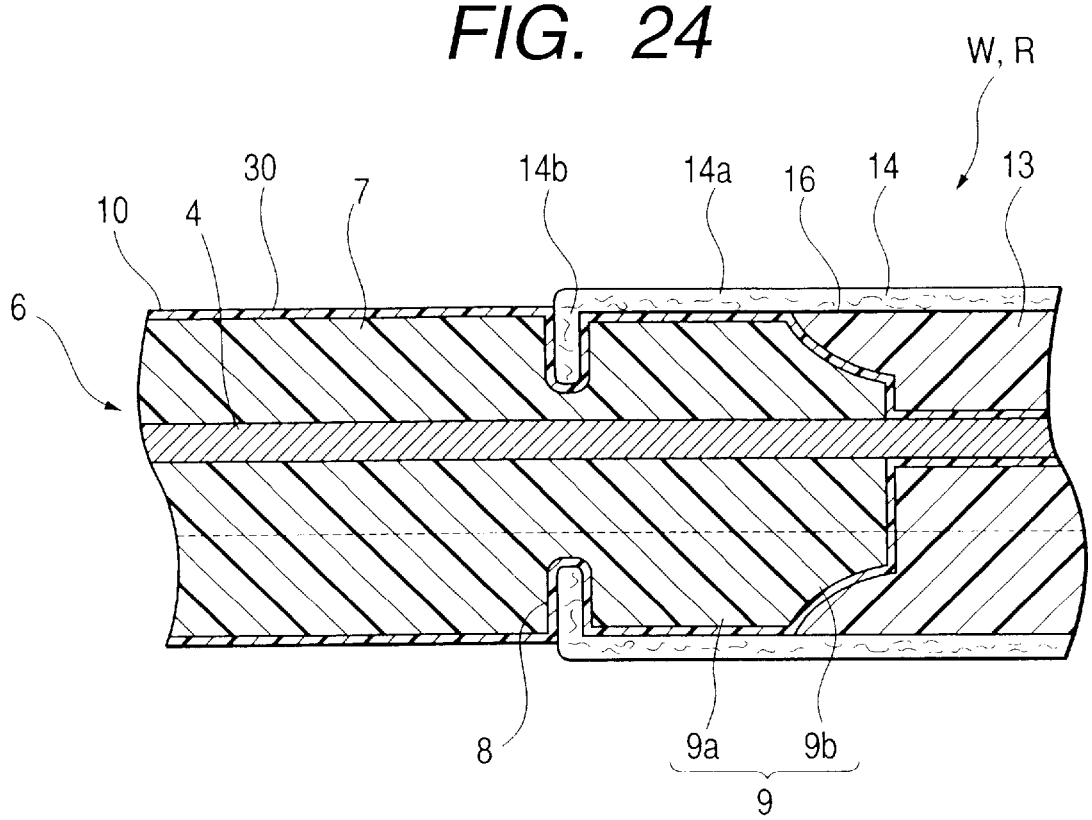
FIG. 24 is an alternative cross sectional view taken along line XI—XI shown in FIG. 7.
Figure 25:
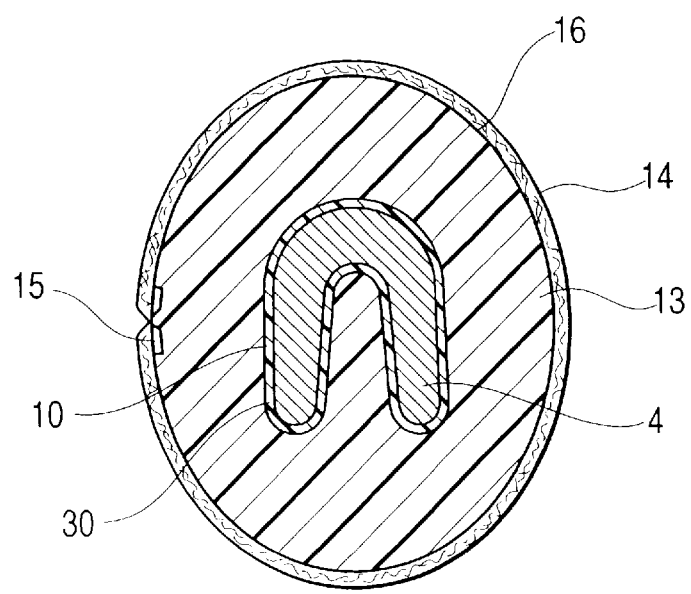
FIG. 25 is an alternative cross sectional view taken along line XI—XI shown in FIG. 7.
Figure 26:
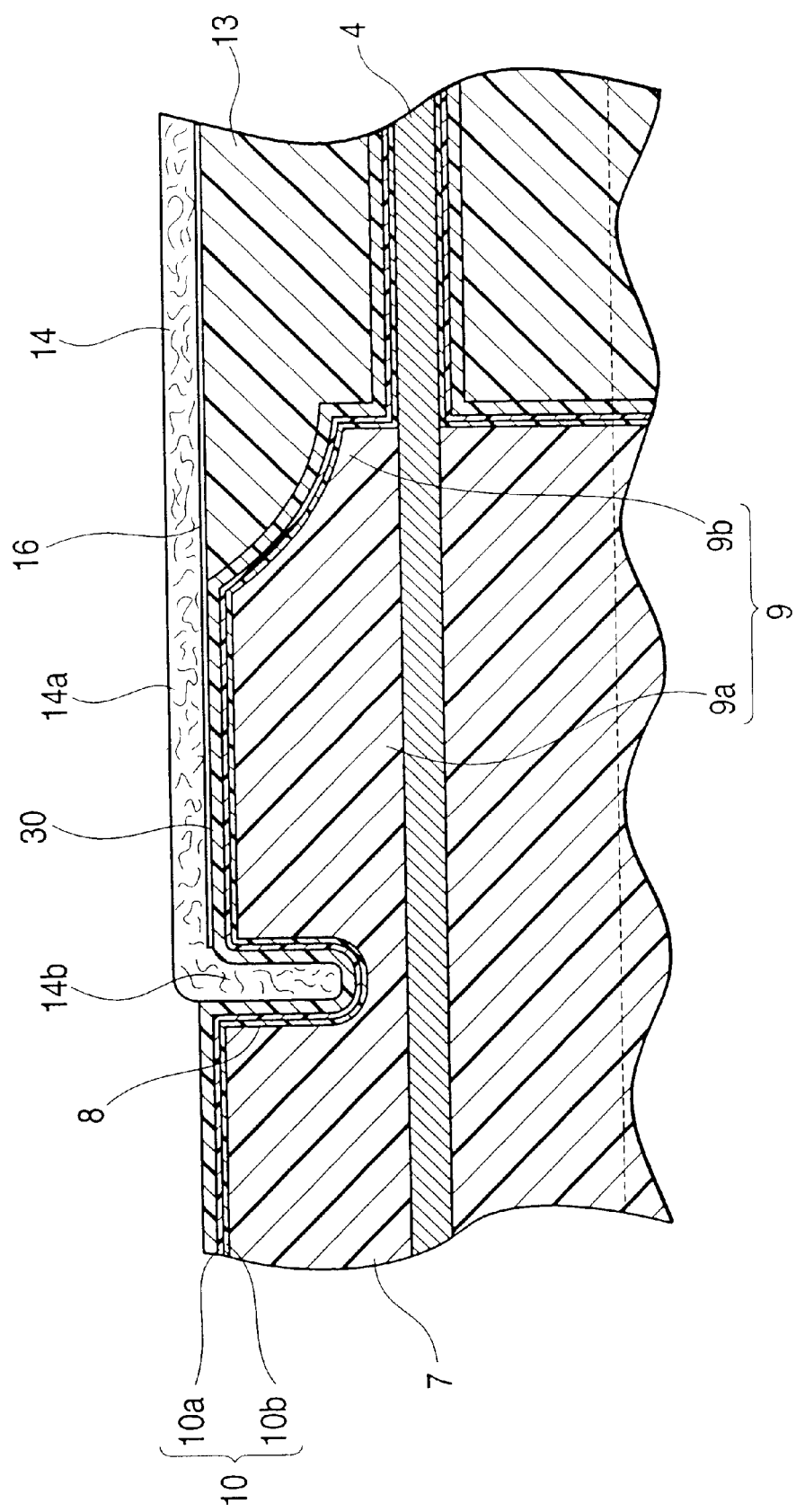
FIG. 26 is an enlarged cross sectional view showing a modification of a portion adjacent to an end of a leather portion according to the embodiment.

An example is shown in FIGS. 24 to 26 in which the leather 14 is bonded to the surface of each of the soft-portion bodies 13 by the adhesive agent 16. Moreover, the sewing thread 15 is used to sew the leather 14 on the inside of the ring portion R adjacent to the boss portion B.

In this embodiment, a transparent coating layer 30 having a thickness of 10 μm to 40 μm and arranged to protect the printed layer 10a is formed on the outer surface of the decorative layer 10. As shown in FIGS. 24 and 26, the coating layer 30 is, together with the decorative layer 10, extended to the inner surface of the woodgrain groove 8 and the outer surface of the support portion 9 including the tapered portion 9b as well as the surface of the body 7. In this embodiment, the coating layer 30 and the decorative layer 10 are extended to the end surface of the support portion 9 and the outer surface of the ring-portion core metal 4.

The coating layer 30 according to this embodiment is made of polyurethane to realize satisfactory adhesiveness between the leather 14 and the soft-portion body 13 made of soft polyurethane.

The steering wheel W according to this embodiment is manufactured by a method similar to the above-mentioned method.

In this embodiment, the hard portions 6 are molded, and then released from the mold for molding the hard portions 6. Then, the boss-portion core metal 2 of the steering-wheel core metal 1 is masked to form the primer layer 10b on the outer surface of the hard portions 6 and the outer surface of the ring-portion core metal 4 except for the boss-portion core metal 2 by coating. Then, hydraulic pressure transfer is performed to transfer the printed layer 10a. Then, the coating layer 30 is formed on the outer surface of the printed layer 10a by coating.

Then, the mask is removed, and then the steering-wheel core metal 1 having the hard portions 6 is introduced into the mold for molding the soft-portion bodies 13. Then, the mold is closed, and then the material for molding the soft-portion bodies 13 is injected. Thus, the soft-portion bodies 13 are molded. The molding surface of the mold for molding the soft-portion bodies 13 is brought to a state in which the molding surface presses the outer surface of the support surface 9a of the support portion 9 of the hard-portion body 7 after the mold has been closed.

Then, the soft-portion bodies 13 are released from the mold for molding the soft-portion bodies 13. Then, the chloroprene adhesive agent 16 is applied to the soft-portion bodies 13 and the portion around the support portion 9. Then, the leather 14 is sewed. At this time, the ends 14b are engaged to the woodgrain groove 8 provided for the hard-portion body 7 while the ends 14a of the leather 14 are being brought into contact with the outer surface of the support surface 9a of the support portion 9 of the hard-portion body 7 through the adhesive agent 16. Then, the sewing thread 15 is used to dispose the leather 14 in the region from the outer surface of the soft-portion body 13 to the woodgrain groove 8 of the hard portions 6.

The steering wheel W according to this embodiment has the structure that the coating layer 30 for covering the hard portions 6 is applied to the outer surface of the support portion 9 including the tapered portion 9b so that the soft-portion body 13 and the leather 14 are bonded to the hard portion 6.

That is, the ends 14a of the leather 14 are bonded to the support portion 9 of the hard portion 6 such that the coating layer 30 is used as the primer layer of the adhesive agent 16. Therefore, separation from the support portion 9 of the hard portion 6 can be prevented. Hence it follows that the ends 14a can firmly be bonded to the support portion 9 of the hard portion 6. As a result, occurrence of a defective appearance of the ring portion R can be prevented even after use for a long time.

The coating layer 30 serving as the primer layer for the leather 14 is formed as surface treatment of the hard portion 6. Therefore, the coating layer 30 can be formed by simply applying to be extended. As a result, the number of man-hours and the manufacturing cost of the steering wheel W can be reduced.

Also the coating layer 30 is applied to the tapered portion 9b formed apart from the inner surface of the leather 14 in the support portion 9 and projecting into the inner surface portion of the soft portion 12 as well as the support surface 9a of the support portion 9 of the hard portion 6 for supporting the leather 14. In the foregoing case, the coating layer 30 serves as an adhesive agent for directly bonding the soft portion 12 to the support portion 9 of the hard portion 6.

Therefore, contraction of the molded soft-portion body 13 can be prevented. As a result, separation of the soft portion 12 from the hard portion 6 and the ring-portion core metal 4 can be prevented. Hence it follows that deterioration in the tough required when the leather 14 is held can be prevented.

In this embodiment, the tapered portion 9b of the support portion 9 of the hard portion 6 is tapered toward the leading end. Therefore, the touch when the portion adjacent to the ends 14a of the leather 14 is held is made such that the hardness is gradually raised toward the support surface 9a of the hard portion 6. Thus, smooth touch can be realized. If the soft-portion body 13 is contracted and separated from the tapered portion 9b, the touch undesirably deteriorates.

In this embodiment, the hard-portion body 7 is made of polypropylene. As an alternative to this, ABS resin or polyester resin may be employed.

In this embodiment, the soft-portion body 13 is made of soft polyurethane. As an alternative to this, soft polyvinyl chloride or thermoplastic elastomer (polyester, polyurethane, polyamide, polyolefine or polystyrene) may be employed.

In this embodiment, the coating layer 30 is made of polyurethane. If satisfactory adhesiveness is realized with the soft-portion body 13 and the leather 14, polyester resin or acrylic resin may be employed.

In this embodiment, the coating layer 30 protects the decorative layer 10 formed by hydraulic pressure transfer. A coating film in a specific color or having a decorative pattern may be provided for the surface of the hard-portion body 7 of the hard portion 6. As an alternative to this, a coating layer 30 for a decorative member, such as a bonded woody member, may be employed. The coating layer 30 directly applied to the hard-portion body 7 of the hard portion 6 to protect the body 7 or decorating the same may as well as be applied to the support portion 9 to serve as the adhesive agent for the leather 14 and the soft-portion body 13.

In this embodiment, the coating layer 30 is as well as extended to the surface of the ring-portion core metal 4 at the position at which the soft-portion body 13 is disposed. In the foregoing case, the adhesiveness of the soft-portion body 13 with respect to the ring-portion core metal 4 can be improved. Therefore, the operation for applying the primer to the ring-portion core metal 4 which is performed before the soft portion 12 is molded can be omitted. Hence it follows that the process for manufacturing the steering wheel W can furthermore be simplified.

Figure 27:
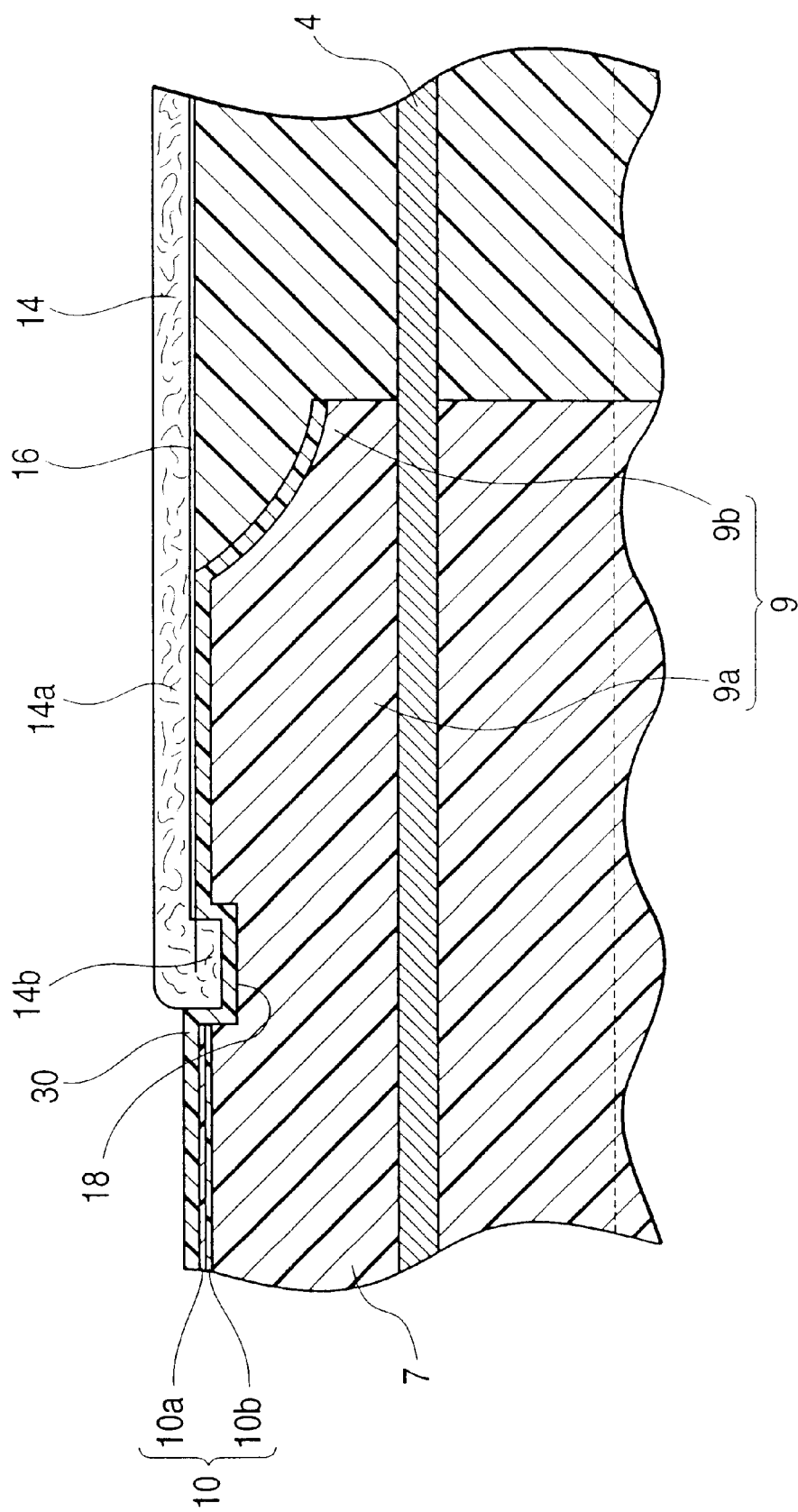
FIG. 27 is an enlarged cross sectional view showing another modification of a portion adjacent to the end of the leather according to the embodiment.
Figure 28:
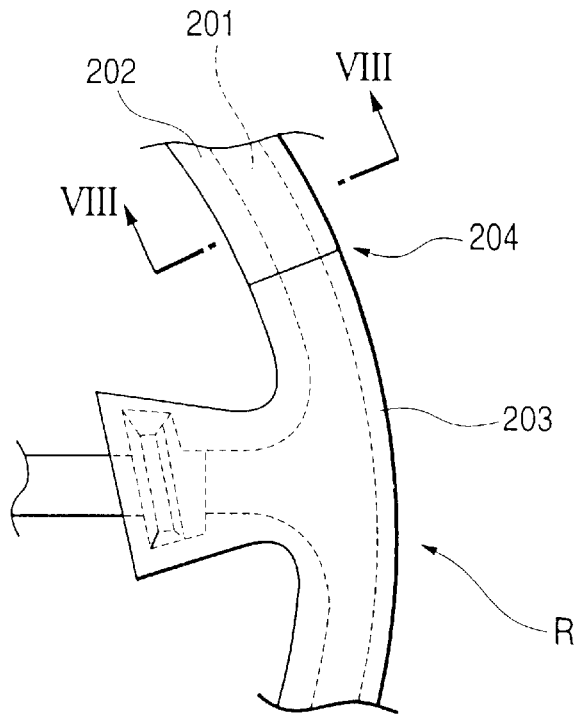
FIG. 28 is partial plan view showing a ring portion according to a conventional example.
Figure 29:
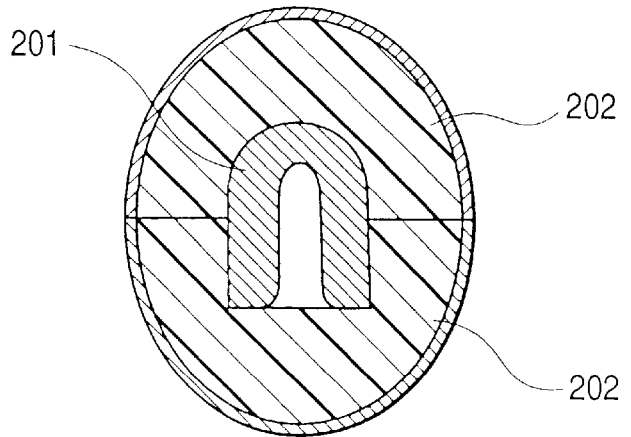
FIG. 29 is a cross sectional view taken along line VIII—VIII shown in FIG. 28.

In this embodiment, the end 14b of the leather 14 is engaged to the woodgrain groove 8 of the hard portion 6. The coating layer 30 enlarges the force for anchoring the ends 14a to the support portion 9 of the hard portion 9. Therefore, as shown in FIG. 27, the woodgrain groove 8 may be omitted. In the foregoing case, the end 14b of the leather 14 is folded back to use the coating layer 30 to bond the ends 14a to the support portion 9 of the hard portion 6. Reference numeral 18 shown in FIG. 27 represents an accommodating recess provided for the hard portion 6 to accommodate the end 14b in order to prevent projection of the end 14b which is thickened owing to folding back.

As shown in FIG. 27, the coating layer 30 is extended to at least the outer surface of the support portion 9. That is, extension to the outer surface of the ring-portion core metal 4 is not required. Similarly, the decorative layer 10 may be extended to the outer surface of the support portion 9. Note that the decorative layer 10 may be provided for only the outer surface of the hard-portion body 7 of the hard portion 6, as shown in FIG. 27.

The first and second embodiments have been described as individual embodiments. The two embodiments may be combined with each other if permitted. Note that the present invention is not limited to only the foregoing embodiments. A variety of modifications are permitted within the scope of the claims.

What is claimed is:

1. A steering wheel, comprising:

a core metal of a ring portion;

a hard portion disposed around said core metal of said ring portion;

a soft portion disposed around said core metal of said ring portion and softer than said hard portion, wherein said hard portion and said soft portion are disposed in a planar circumferential direction of said core metal of said ring portion, and said core metal of said ring portion is die-cast metal, a decorative layer disposed on a surface of the hard portion;

a coating layer applied to the surface of said decorative layer; and a leather disposed on the surface of said soft portion, wherein said decorative layer incorporates a printed layer and a primer layer disposed between the surface of said hard portion and said printed layer to enhance adhesion between said hard layer and said printed layer, ends of said leather are supported by support portions formed at the ends of said hard portion and secured to said hard portion, and said decorative layer and said coating layer are applied to the outer surface of each of said support portions, and said soft portion and said leather are bonded to said hard portion through said decorative layer and said coating layer, wherein said decorative layer and said coating layer are applied to a portion between said core metal of said ring portion and said soft portion.

* * * * *